(12) United States Patent
Yasumura

(10) Patent No.: US 7,298,634 B2
(45) Date of Patent: Nov. 20, 2007

(54) SWITCHING POWER SUPPLY CIRCUIT

(75) Inventor: Masayuki Yasumura, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/534,142

(22) PCT Filed: Dec. 19, 2003

(86) PCT No.: PCT/JP03/16339

§ 371 (c)(1),
(2), (4) Date: Apr. 3, 2006

(87) PCT Pub. No.: WO2004/066480

PCT Pub. Date: Aug. 5, 2004

(65) Prior Publication Data

US 2006/0192774 A1    Aug. 31, 2006

(30) Foreign Application Priority Data

Dec. 27, 2002 (JP) ............................. 2002-381226
Oct. 8, 2003 (JP) ............................. 2003-349482

(51) Int. Cl.
H02M 3/335    (2006.01)
H02M 7/68    (2006.01)

(52) U.S. Cl. ........................... 363/24; 363/98; 363/134
(58) Field of Classification Search .................. 363/24, 363/25, 26, 17, 98, 133, 134
See application file for complete search history.

(56) References Cited

U.S. PATENT DOCUMENTS 5,274,543 A * 12/1993 Loftus, Jr. ................... 363/127
5,345,374 A * 9/1994 Sato et al. ..................... 363/24
6,144,445 A * 11/2000 Nilssen ................... 315/209 R
6,274,987 B1 * 8/2001 Burke ........................ 315/307
6,288,378 B1 * 9/2001 Patridge et al. ............. 219/661
6,316,883 B1 * 11/2001 Cho et al. .................... 315/247
6,674,654 B2 * 1/2004 Winick et al. ................. 363/16
6,703,794 B2 * 3/2004 Chen .......................... 315/247
6,856,095 B2 * 2/2005 Zeng et al. .................... 315/70
7,209,373 B2 * 4/2007 Oicles et al. .................. 363/59

* cited by examiner

Primary Examiner—Bao Q. Vu
(74) Attorney, Agent, or Firm—Lerner, David, Littenberg, Krumholz & Mentlik, LLP

(57) ABSTRACT

A switching power supply circuit includes a plurality of switching converters, each including a partial resonance voltage circuit combined with a current resonance type switching converter using a half-bridge connection system. For changeover control, a rectification circuit serves as a voltage doubler rectification circuit at an AC voltage less than or equal to 150V, but serves as a full-wave rectification circuit at an AC voltage greater than or equal to 150V. The voltage output of the converters is fed back to a rectification current path by a power factor improving transformer, the rectification current being interrupted by means of a rectification diode to expand the conduction angle of the AC input current. A DC switch circuit in the rectification current path is switched between on and off conditions in response to the input of a predetermined starting signal to control the starting order of the secondary side DC output voltage.

7 Claims, 11 Drawing Sheets

US 7,298,634 B2

SWITCHING POWER SUPPLY CIRCUIT

TECHNICAL FIELD

This invention relates to a switching power supply circuit including a circuit for the power factor improvement, and a plasma display apparatus which incorporates the switching power supply circuit.

BACKGROUND ART

In recent years, since switching elements which can withstand comparatively high current and voltage of a high frequency have been developed, most of power supply circuits which rectify commercial power supply to obtain a desired DC voltage are formed as power supply circuits of the switching type.

A switching power supply circuit reduces the size of transformers and other devices by using a high switching frequency and is used as a high-power DC-DC converter and as a power supply for various kinds of electronic apparatus.

Incidentally, generally if commercial power supply is rectified, then since current flowing through a smoothing circuit is distorted in waveform, there is a problem that the power factor indicative of the utilization efficiency of power supply is damaged.

Further, a countermeasure for suppressing harmonics generated by current of a distorted waveform is required.

Thus, a method which incorporates a so-called active filter wherein a step-up type converter of the PWM control type is provided in a rectification circuit system to make the power factor approach 1 (refer to, for example, Japanese Patent Laid-Open No. Hei 6-327246 (FIG. 11)).

A circuit diagram of FIG. 8 shows a basic configuration of such an active filter as described above.

Referring to FIG. 8, a bridge rectification circuit Di is connected to a commercial AC power supply AC. An output capacitor Cout is connected in parallel to positive/negative lines of the bridge rectification circuit Di. A rectification output of the bridge rectification circuit Di is supplied to the output capacitor Cout, and consequently, a DC voltage Vout is obtained as a voltage across the output capacitor Cout. The DC voltage Vout is supplied as an input voltage to a load 10 such as, for example, a DC-DC converter at the following stage.

As a configuration for the power factor improvement, an inductor L, a diode D of the high speed recovery type, a resistor Ri, a switching element Q and a multiplier 11 are provided as shown in FIG. 8.

The inductor L and the diode D are inserted in series between the positive output terminal of the bridge rectification circuit Di and the positive electrode terminal of the output capacitor Cout.

The resistor Ri is inserted between the negative output terminal (primary side ground) of the bridge rectification circuit Di and the negative terminal of the output capacitor Cout.

Further, in this instance, a MOS-FET is selectively used for the switching element Q, and the switching element Q is inserted between a node between the inductor L and the diode D and the primary side ground as seen in FIG. 8.

A current detection line LI and an waveform input line Lw are connected as a feedforward circuit to the multiplier 11, and a voltage detection line LV is connected as a feedback circuit to the multiplier 11.

The multiplier 11 detects the level of rectification current flowing to the negative output terminal of the bridge rectification circuit Di which is inputted from the current detection line LI.

Further, the multiplier 11 detects a rectification voltage waveform at the positive output terminal of the bridge rectification circuit Di inputted from the waveform input line Lw. This corresponds to the fact that a waveform of the commercial AC power supply AC (AC input voltage) is detected as an absolute value.

Further, the multiplier 11 detects a variation difference of the DC voltage Vout of the output capacitor Cout inputted from the voltage detection line LV. In other words, the multiplier 11 detects a variation difference of the DC input voltage to be inputted to the load 10.

Then, a drive signal for driving the switching element Q is outputted from the multiplier 11.

Rectification current which flows to the negative output terminal of the bridge rectification circuit Di is inputted from the current detection line LI to the multiplier 11. The multiplier 11 detects the rectification current level inputted from the current detection line LI. Further, the multiplier 11 detects a variation difference of the DC voltage Vout (DC input voltage) of the output capacitor Cout inputted from the voltage detection line LV. Furthermore, the multiplier 11 detects the rectification voltage waveform at the positive output terminal of the bridge rectification circuit Di inputted from the waveform input line Lw.

This corresponds to the fact that the waveform of the commercial AC power supply AC (AC input voltage) is detected as an absolute value.

The multiplier 11 first multiplies the rectification current level detected from the current detection line LI in such a manner as described above by the variation difference of the DC input voltage detected from the voltage detection line LV. Then the multiplier 11 produces a current instruction value of a waveform same as that of an AC input voltage VAC from a result of the multiplication and the waveform of the AC input voltage detected from the waveform input line Lw.

Furthermore, the multiplier 11 compares the current instruction value described above and an actual AC input current level (detected based on the input from the current detection line LI) with each other and performs PWM control with regard to the PWM signal in response to the difference to produce a drive signal based on the PWM signal. The switching element Q is switching driven with the drive signal. As a result, the AC input current is controlled so as to have a waveform same as that of the AC input voltage, and the power factor is improved so that it approaches almost 1. Further, in this instance, since the current instruction value produced by the multiplier 11 is controlled so that the amplitude thereof may vary in response to the variation difference of the DC input voltage (Vout), also the variation of the DC input voltage (Vout) is suppressed.

FIG. 9(a) illustrates the input voltage Vin and the input current Iin inputted to the active filter circuit shown in FIG. 8. The input voltage Vin corresponds to a voltage waveform as a rectification output of the bridge rectification circuit Di, and the input current Iin corresponds to a current waveform as a rectification output of the bridge rectification circuit Di. Here, although the waveform of the input current Iin has a conduction angle equal to that of the rectification output voltage (voltage Vin) of the bridge rectification circuit Di, this indicates that also the waveform of the AC input current flowing from the commercial AC power supply AC to the bridge rectification circuit Di has a conduction angle equal to that of the current Iin. In other words, a power factor proximate to 1 is obtained.

FIG. 9(b) illustrates a variation of energy (power) Pchg which is inputted to and outputted from the output capacitor Cout. The output capacitor Cout accumulates energy when the input voltage Vin is high but emits energy when the input voltage Vin is low thereby to keep the flow of the output voltage.

FIG. 9(c) illustrates a waveform of charge/discharge current Ichg to/from the output capacitor Cout. The charge/discharge current Ichg is current which flows corresponding to accumulation/emission operation of the energy Pchg into/from the output capacitor Cout as can be recognized from the fact that the charge/discharge current Ichg has a phase same as that of the waveform of the input/output energy Pchg of FIG. 9(b).

Different from the input voltage Vin, the charge/discharge current Ichg has a waveform substantially same as that of a second order harmonic wave of the AC line voltage (commercial AC power supply AC). A ripple voltage Vdc is generated on the second order harmonic wave component of the AC line voltage as seen in FIG. 9(d) by a flow of energy to and from the output capacitor Cout. The ripple voltage Vdc has a phase difference of 90° from the charge/discharge current Ichg illustrated in FIG. 9(c) in order to conserve invalid energy. The rating of the output capacitor Cout is determined taking it into consideration that ripple current of the second order harmonic wave and high frequency ripple current from a boost converter switch for modulating the ripple current are processed.

FIG. 10 shows an example of a configuration of an active filter which includes the circuit configuration of FIG. 8 as a basic configuration and further includes a basic control circuit system. It is to be noted that like elements to those in FIG. 8 are denoted by like reference characters and description thereof is omitted herein.

A switching pre-regulator 17 is provided between the positive output terminal of a bridge rectification circuit Di and the positive terminal of an output capacitor Cout. The switching pre-regulator 17 is a block formed from the switching element Q, inductor L, diode D and so forth in FIG. 8.

Further, the control circuit system including a multiplier 11 further includes a voltage error amplifier 12, a divider 13 and a squarer 14.

The voltage error amplifier 12 divides a DC voltage Vout of the output capacitor Cout by means of a voltage dividing resistors Rvo-Rvd and inputs the divided voltage to the non-negated input of an operational amplifier 15. A reference voltage Vref is inputted to the negated input of the operational amplifier 15. The operational amplifier 15 amplifies a voltage of a level corresponding to an error of the divided DC voltage Vout from the reference voltage Vref with an amplification factor determined from a feedback resistor Rv1 and a capacitor Cv1 and outputs a resulting voltage as an error output voltage Vvea to the divider 13.

Further, a so-called feedforward voltage Vff is inputted to the squarer 14. The feedforward voltage Vff is an output (average input voltage) obtained by averaging the input-voltage Vin by means of an averaging circuit 16 (Rf11, Rf12, Rf13, Cf11, Cf12). The squarer 14 squares the feedforward voltage Vff and outputs a resulting value to the divider 13.

The divider 13 divides the error output voltage Vvea from the voltage error amplifier 12 by the square value of the average input voltage outputted from the squarer 14 and outputs a signal as a result of the division to the multiplier 11.

In short, a voltage loop is formed from a system of the squarer 14, divider 13 and multiplier 11. Then, the error output voltage Vvea outputted from the voltage error amplifier 12 is divided by the square of the average input voltage (Vff) at a stage before it is multiplied by a rectification input signal Ivac by the multiplier 11. By this circuit, the gain of the voltage loop is maintained fixed without any variation as the square of the average input voltage (Vff). The feedforward voltage Vff has a function of open loop correction fed in a forward direction in the voltage loop.

To the multiplier 11, an output of the divider 13 obtained by dividing the error output voltage Vvea by means of the divider 13 and a rectification output (Iac) of the positive output terminal (rectification output line) of the bridge rectification circuit Di through a resistor Rvac are inputted. Here, the rectification output is indicated not as a voltage but as current (Iac). The multiplier 11 multiplies the inputs to produce and output a current programming signal (multiplier output signal) Imo. This corresponds to the current instruction value described hereinabove with reference to FIG. 8. The output voltage Vout is controlled by varying the average amplitude of the current programming signal. In particular, a PWM signal is produced in accordance with a variation of the average amplitude of the current programming signal, and switching driving is performed with a drive signal based on the PWM signal to control the level of the output voltage Vout.

Accordingly, the current programming signal has a waveform of an average amplitude for controlling the input voltage and the output voltage. It is to be noted that the active filter controls not only the output voltage Vout but also the input voltage Vin. Then, since it can be said that the current loop in the feedforward circuit is programmed with the rectification line voltage, the input to the converter (load 10) at the next stage becomes a resistive input.

FIG. 11 shows an example of a configuration of a power supply circuit wherein a current resonance type converter is connected as a next stage to an active filter having the configuration shown in FIG. 10. The power supply circuit shown in FIG. 11 is ready for the AC input voltage VAC=85 V to 288 V. In short, the power supply circuit is of the so-called wide range ready type (worldwide specifications) ready for both AC input voltages of the AC 100 V system and the AC 200 V system as commercial AC power supply. Further, the load power for which the power supply circuit is ready is 600 W or more. Further, the current resonance type converter adopts a configuration by the separately excited half bridge coupling system.

The power supply circuit shown in FIG. 11 is provided in display apparatus such as television receivers and monitor apparatus which include a plasma display panel which has been and is being popularized in recent years. In other words, the power supply circuit shown in FIG. 11 supplies operating power supply for an internal circuit of a display apparatus (plasma display apparatus) which includes such a plasma display panel as described above.

To a commercial AC power supply AC line in this instance, two common mode choke coils CMC, CMC and three across capacitors CL are connected in a connection scheme shown in FIG. 11 to form a line noise filter for common mode noise.

Further, in this instance, a main switch SW for activating/deactivating the power supply is shown inserted in the commercial AC power supply AC line.

To the positive/negative lines of the commercial AC power supply AC, the positive input terminals and the negative input terminals of two bridge rectification circuits Di1 and Di2 are connected commonly, respectively. Further, the positive output terminals of the bridge rectification circuits Di1 and Di2 are connected to each other, and the negative output terminals (ground terminals) of the bridge rectification circuits Di1 and Di2 are connected to each other. In short, in this instance, two stages of bridge rectification circuits are provided for the commercial AC power supply AC.

Further, a normal mode noise filter 4 formed from one choke coil LN and three filter capacitors (film capacitors) CN, CN, CN connected in such a manner as shown in FIG. 11 is connected between the positive output terminals and the negative output terminals (primary side ground) of the bridge rectification circuits Di1 and Di2.

An active filter circuit 8 is provided at a next stage to the normal mode noise filter 4.

The active filter circuit 8 is based on the configuration described hereinabove with reference to FIG. 10. In particular, the active filter circuit 8 includes a step-up type converter of the PWM control type which performs switching between the rectification outputs inputted from the bridge rectification circuits Di1 and Di2. Such a step-up type converter as mentioned above is formed, for example, including a switching element, and a control circuit system for driving the switching element in accordance with a PWM control system.

Further, in order to cope with a heavy load condition of, for example, the load power Po=600 W or more as in the present case, such a countermeasure that a plurality of switching elements are provided and connected in parallel or the like is adopted. When the load is heavy, particularly in a condition that the AC input voltage VAC is 100 V or less, very high current flows through a switching element. Therefore, a plurality of switching elements are connected in parallel in such a manner as described above so that the peak level of switching current flow to each of the switching devices is suppressed. Consequently, the reliability of the active filter circuit 8 is enhanced.

Meanwhile, the control circuit system includes a multiplier, a divider, an error voltage amplifier, a PWM control circuit, a drive circuit for outputting a drive signal for switching driving the switching elements, and so forth, and is formed, for example, as a single IC chip. A circuit block corresponding to the multiplier 11, voltage error amplifier 12, divider 13, squarer 14 and so forth shown in FIG. 10 is incorporated in the IC as the control circuit system. And, the feedback circuit system and the feedforward circuit system are connected in such a manner as described hereinabove with reference to FIGS. 8 and 10 to the IC chip as the control circuit system, and the IC chip as the control circuit system drives the switching elements by PWM control based on feedback outputs from the circuit systems.

The switching driving of the switching elements in the active filter circuit 8 having the configuration described above is performed in accordance with the drive signal based on the PWM control so that the conduction angle of the rectification output current may be substantially equal to that of the rectification output voltage waveform as described hereinabove with reference to FIGS. 8 and 10. That the conduction angle of the rectification output current is substantially equal to that of the rectification output voltage waveform signifies that the conduction angle of the AC input current flowing in from the commercial AC power supply AC is substantially equal to that of the waveform of the AC input voltage VAC, and as a result, the power factor is controlled so as to approach 1. In short, improvement of the power factor is achieved. In an actual case, a characteristic that a power factor PF=approximately 0.995 is obtained when the load power Po=600 W.

Further, the active filter control circuit 8 shown in FIG. 11 operates also such that the average value of the rectification smoothed voltage Ei (corresponding to Vout in FIG. 10) may be a fixed voltage within the range of AC input voltage VAC=85 V to 288 V. In short, a DC input voltage stabilized to 375 V is supplied to the current resonance type converter at the next stage irrespective of the range of variation of the AC input voltage VAC=85 V to 264 V.

The range of the AC input voltage VAC=85 V to 288 V continuously covers the AC 100 V system and the AC 200 V system of commercial AC power supply. Accordingly, the stabilized DC input voltage (Ei) of the equal level is supplied to the switching converter at the next stage irrespective of whether the commercial AC power supply AC is of the 100 V system or the 200 V system. In short, the power supply circuit shown in FIG. 11 is formed also as a power supply circuit ready for a wide range through the provision of the active filter.

In this instance, a set of three smoothing capacitors CiA, CiB and CiC are connected in series at the next stage to the active filter circuit 8.

The set of the smoothing capacitors [CiA//CiB//CiC] corresponds to the output capacitor Cout in FIGS. 8 and 10. Accordingly, in this instance, the rectification smoothed voltage Ei is obtained as a voltage across the set of the smoothing capacitors [CiA//CiB//CiC] connected in parallel. The rectification smoothed voltage Ei is supplied as a DC input voltage to converter sections 201, 202 and 203 at the next stage. Then, as described hereinabove, the voltage (rectification smoothed voltage Ei) across the smoothing capacitors [CiA//CiB//CiC] in this instance is stabilized at 375 V.

Further, in the power supply circuit shown in FIG. 11, in order to cope with such a heavy load condition as described hereinabove, a plurality of composite resonance type converts which use the DC input voltage of the rectification smoothed voltage Ei as the operating voltage are provided. The composite resonance type converter here signifies a switching converter of a configuration wherein, in addition to a resonance circuit for making operation of the switching converter that of a resonance type, another resonance circuit is added to the primary side or the secondary side such that the plurality of resonance circuits operate compositely in one switching converter. In FIG. 11, three composite resonance type converters of the first converter section 201, second converter section 202 and third converter section 203 are provided. Each of the composite resonance type converters here is formed from a primary side partial voltage resonance circuit added to a current resonance type converter as hereinafter described.

For example, the first converter section 201 includes, as components thereof, two switching elements Q1 and Q2 as shown in FIG. 11. In this instance, the switching elements Q1 and Q2 are connected in a half-bridge connection such that the switching element Q1 serves as a high side switching element and the switching element Q2 serves as a low side switching element, and are connected in parallel to the rectification smoothed voltage Ei (DC input voltage). In short, the first converter section 201 has a configuration as a current resonance type converter of the half-bridge coupling type.

The current resonance type converter in this instance is of the separately excited type, and corresponding to this, a MOS-FET is used for the switching elements Q1 and Q2. Clamp diodes DD1 and DD2 are connected in parallel to the switching elements Q1 and Q2, respectively, such that a switching circuit is formed. The clamp diodes DD1 and DD2 form paths along which reverse current upon turning off of the switching elements Q1 and Q2 flows, respectively.

A control IC 2 includes an oscillation circuit for driving the current resonance type converter in a separately excited manner, a control circuit, a protection circuit and the like. The control IC 2 is an analog IC (Integrated Circuit) having a bipolar transistor inside thereof.

The control IC 2 operates with a DC voltage inputted to a power supply input terminal Vcc. In this instance, the rectification smoothed voltage Ei inputted through a resistor Rs is inputted to the power supply input terminal Vcc. Further, a ground electrode E is directly connected to the primary side ground.

The control IC 2 includes two drive signal output terminals VGH and VGL as terminals for outputting a drive signal (gate voltage) to the switching elements.

A drive signal for switching driving the high side switching element is outputted from the drive signal output terminal VGH, and another drive signal for switching driving the low side switching element is outputted from the drive signal output terminal VGL.

In this instance, the drive signal output terminal VGH is connected to the gate of the high side switching element Q1. Meanwhile, the drive signal output terminal VGL is connected to the gate of the low side switching element Q2.

Consequently, the drive signal for the high side outputted from the drive signal output terminal VGH is applied to the gate of the switching element Q1, and the drive signal for the low side outputted from the drive signal output terminal VGL is applied to the gate of the switching element Q2.

The control IC 2 produces an oscillation signal of a required frequency from an internal oscillation circuit. Then, the control IC 2 utilizes the oscillation signal produced by the oscillation circuit to produce a drive signal for the high side and another drive signal for the low side. Here, the drive signal for the high side and the drive signal for the low side are produced in such a mutual relationship that they have a phase difference of 180°. Then, the drive signal for the high side is outputted from the drive signal output terminal VGH, and the drive signal for the low side is outputted from the drive signal output terminal VGL.

Since the drive signal for the high side and the drive signal for the low side are applied to the switching elements Q1 and Q2, respectively, within a period within which the drive signal has the H level, the gate voltage of the switching element Q1 or Q2 becomes equal to or higher than a gate threshold value and the switching element Q1 or Q2 is placed into an on state. On the other hand, within another period within which the drive signal has the L level, the gate voltage becomes equal to or lower than the gate threshold value and the switching element Q1 or Q2 is placed into an off state. Consequently, the switching elements Q1 and Q2 are switching driven with a required switching frequency at timings at which they are turned on/off alternately.

To an activation terminal Vt of the control IC 2, a starting signal Vt1 outputted from a microcomputer (not shown in FIG. 11 (not shown) provided in an apparatus in which the power supply circuit shown in FIG. 11 is incorporated is inputted.

The control IC 2 is activated at a timing at which the starting signal is inputted to start operation thereof. In short, the control IC 2 starts outputting of the drive signals from the drive signal output terminal VGH and the drive signal output terminal VGL. Accordingly, the operation starting timing of the first converter section 201 is determined by an inputting timing of the starting signal Vt1 of the control IC 2.

An insulating converter transformer PIT-1 is provided for transmitting the switching outputs of the switching elements Q1 and Q2 from the primary side to the secondary side.

A primary winding N1 of the insulating converter transformer PIT-1 is connected at an end portion thereof to the node (switching output point) of the switching elements Q1 and Q2 through a primary side series resonance capacitor C1 and at the other end portion thereof to the primary side ground. Here, a primary side series resonance circuit is formed from the capacitance of the primary side series resonance capacitor C1 and the leakage inductance (L1) of the primary winding N1. The primary side series resonance circuit performs resonance operation when the switching outputs of the switching elements Q1 and Q2 are supplied thereto, and thereby makes operation of the switching circuit formed from the switching elements Q1 and Q2 that of the current resonance type.

A partial resonance capacitor Cp is connected in parallel between the drain-source of the switching element Q2. The capacitance of the partial resonance capacitor Cp and the current detection line LI of the primary winding N1 cooperatively form a parallel resonance circuit (partial voltage resonance circuit). Then, partial voltage resonance operation wherein voltage resonance occurs only upon turning on of the switching elements Q1 and Q2 is obtained.

In this manner, the power supply circuit shown in FIG. 11 has a form as a composite resonance type converter wherein a resonance circuit for making a primary side switching converter that of the resonance type is combined with another resonance circuit.

On the secondary side of the insulating converter transformer PIT-1, two secondary windings N2a and N2b are wound independently of each other as secondary windings.

The secondary winding N2a in this instance has a center tap provided thereon as shown in FIG. 11 and connected to the secondary side ground, and a full-wave rectification circuit formed from rectification diodes Do1 and Do2 and a smoothing capacitor Co1 is connected to the secondary winding N2a. Consequently, a secondary side DC output voltage Eo1 is obtained as a voltage across the smoothing capacitor Co1. The secondary side DC output voltage Eo1 is supplied to the load side not shown and is branched and inputted also as a detection voltage for a control circuit 1.

The control circuit 1 supplies a voltage or current whose level is adjusted in response to the level of the secondary side DC output voltage Eo1 inputted thereto as a control output to a control input terminal Vc of the control IC 2. The control IC 2 adjusts, for example, the frequency of the oscillation signal in response to the control output inputted to the control input terminal Vc to adjust the frequency of the drive signals to be outputted from the drive signal output terminals VGH and VGL. Consequently, the switching frequency of the switching elements Q1 and Q2 is variably controlled, and as the switching frequency is adjusted in this manner, the level of the secondary side DC output voltage Eo1 is controlled so as to be fixed. In other words, stabilization according to the switching frequency control method is performed.

Further, in this instance, the circuit is formed such that the secondary side DC output voltage Eo1 is branched to form secondary side output voltages Eo and Eo2.

The circuit system for producing the secondary side output voltage Eo is formed as a step-down type converter wherein a switching element Q7 formed from a MOS-FET, a rectification diode Dcn1, a choke coil L1 for high frequency noise removal, a smoothing capacitor Co, and a control circuit 7 for executing PWM (Pulse Width Modulation) control are connected in such a manner as seen in FIG. 11.

The switching element Q7 is switching driven by the control circuit 7 to switch the secondary side DC output voltage Eo1 to obtain an alternating output. The alternating output is rectified and smoothed by a half-wave rectification circuit formed from the choke coil L1, rectification diode Dcn1 and smoothing capacitor Co to produce the secondary side DC output voltage Eo as a voltage across the smoothing capacitor Co.

Here, the control circuit 7 executes the PWM control in response to the level of the secondary side DC output voltage Eo. Consequently, the switching operation of the switching element Q7 is controlled so that the switching frequency is fixed in response to the level of the secondary side DC output voltage Eo and the on-period within one switching period is varied. Consequently, the level of the secondary side DC output voltage Eo is controlled so as to be fixed. In other words, stabilization of the secondary side DC output voltage Eo is achieved.

Also the circuit system for producing the secondary side output voltage Eo2 is formed as a step-down type converter wherein a switching element Q8 formed from a MOS-FET, a rectification diode Dcn2, a choke coil L2, a smoothing capacitor Co2 and a control circuit 7 are connected in a similar connection scheme as that of the circuit system for producing the secondary side DC output voltage Eo1 described hereinabove.

Accordingly, also in this instance, a secondary side DC output voltage Eo2 stabilized by the PWM control of the control circuit 7 is obtained as a voltage across the smoothing capacitor Co2.

Meanwhile, for the secondary winding N2b, a full-wave rectification circuit formed from a bridge rectification circuit DBR and a smoothing capacitor Co3 is formed, and a secondary side DC output voltage Eo3 is obtained as a voltage across the smoothing capacitor Co3 by rectification smoothing of the full-wave rectification circuit.

The second converter section 202 has a configuration as a composite resonance type converter wherein a current resonance type converter and a primary side partial voltage resonance circuit are combined by connecting switching elements Q3 and Q4 connected in a half-bridge connection, clamp diodes DD3 and DD4, a partial resonance capacitor Cp, a control IC 2, a primary winding N1 of an insulating converter transformer PIT-2 and so forth are connected in a connection scheme similar to that of the first converter section 201 described hereinabove.

Further, the secondary side of the second converter section 202 is connected at a center tap of the secondary winding N2 to the secondary side ground, and a full-wave rectification circuit including rectification diodes Do1 and Do2, smoothing capacitors Co4 and Co5 and a resistor R1 for noise removal is formed in such a manner as seen in FIG. 11 for the secondary winding N2. Consequently, a secondary side DC output voltage Eo4 is produced as a voltage across the smoothing capacitor Co5.

Further, in the second converter section 202, since the control circuit 7 executes switching frequency control of the primary side converter based on the level of the secondary side rectification smoothed voltage obtained across the smoothing capacitor Co4, stabilization of the secondary side DC output voltage Eo4 is achieved.

Further, in the second converter section 202, an activation signal Vt3 outputted from the microcomputer is inputted to an activation terminal Vt of the control IC 2.

Also the third converter section 203 has a configuration as a composite resonance type converter wherein a current resonance type converter and a primary side partial voltage resonance circuit are combined by connecting switching elements Q5 and Q6 connected in a half-bridge connection, clamp diodes DD5 and DD6, a partial resonance capacitor Cp, a control IC 2, an insulating converter transformer PIT-3 (primary winding N1 and secondary winding N2, rectification diodes Do1 and Do2, smoothing capacitors Co6 and Co7 and a resistor R2 in a connection scheme similar to that of the second converter section 202. Also in the third converter section 203, a secondary side DC output voltage Eo5 stabilized by switching frequency control by the control circuit 7 is obtained.

Further, an activation signal Vt2 outputted from the microcomputer is inputted to an activation terminal Vt of the control IC 2 of the third converter section 203.

In the configuration described above, the six secondary side DC output voltages Eo, Eo1 to Eo5 are obtained from the secondary side. The secondary side DC output voltages have, for example, such applications and load specifications as given below.

Eo: logic power supply, 5 V/6 A to 2 A
Eo1: analog IC driving power supply, 12 V/0.4 A
Eo2: digital IC driving power supply, 3.3 V/1.5 A
Eo3: sound outputting power supply, 26 V/1.3 A to 0.1 A
Eo4: data power supply, 70 V/2.5 A to 0.35 A
Eo5: maintaining power supply, 200 V/1.75 A to 0.1 A Further, the maximum load powers for which the individual converter sections should be ready are, first converter section 201: 75 W,
second converter section 202: 175 W and
third converter section 203: 350 W and totally 600 W.

Further, the cores of the insulating converter transformers are selected in the following manner in accordance with such maximum load powers for which the converter sections should be ready as mentioned hereinabove:

PIT-1: EER-35
PIT-2: EER-40
PIT-3: EER-42

Meanwhile, the choke coils L11 and L12 of the step-down type converters employ a ferrite core of EE-25.

The power supply circuit provided in the plasma display apparatus outputs a plurality of secondary side DC output voltages Eo, Eo1 to Eo5 individually corresponding to the different load conditions as illustrated in FIG. 11. Further, particularly in the plasma display apparatus, for the convenience of the circuit configuration, when the power supply is activated to start the DC input voltage (rectification smoothed voltage Ei (375 V)), it is necessary for the secondary side DC output voltages to be started in a predetermined order.

More particularly, the secondary side DC output voltage Eo which is the logic power supply is started up first, and then the secondary side DC output voltage Eo5 which is the maintaining power supply and the secondary side DC output voltage Eo4 which is the data power supply are successively started.

Thus, in order to obtain such a starting order of the secondary side DC output voltages as described above, the microcomputer outputs the starting voltages Vt1, Vt2 and Vt3 to the starting terminals Vt of the control ICs 2 of the converter sections (201, 202 and 203). Control operation of the starting up order of the secondary side DC output voltages by the starting voltages Vt1, Vt2 and Vt3 is illustrated in a timing chart of FIG. 12.

Here, the power supply circuit shown in FIG. 11 has a configuration of a so-called main power supply, and no standby power supply is shown in FIG. 11. Since the microcomputer is supplied with the standby power supply, even if the main power supply is not in an activated state, the microcomputer can operate.

Then, if the main switch SW is changed over from an off state to an on state in order to activate the circuit shown in FIG. 11 which is a main power supply, then the commercial AC power supply AC is supplied to the circuit and the rectification smoothed voltage Ei is obtained. Then, if it is detected by the microcomputer that the rectification smoothed voltage Ei rises up to a prescribed level (for example, 375 V), then the microcomputer changes over the starting signal Vt1 from the L level to the H level and outputs the starting signal Vt1 of the H level at a timing of time t1. Consequently, the control IC 2 of the first converter section 201 to which the starting signal Vt1 is inputted starts switching driving operation at time t1. Then, in response to this, the secondary side DC output voltage Eo obtained on the secondary side of the first converter section 201 starts its rise from the 0 level at time t1 and rises up to a prescribed level (5 V) at a point of time when a certain period of time elapses. Thereafter, the secondary side DC output voltage Eo maintains the stabilized state at 12 V by the constant voltage control operation by the step-down converter.

It is to be noted that it is described for the confirmation that also the remaining secondary side DC output voltages Eo1, Eo2 and Eo3 produced by the same first converter section 201 rise at a timing substantially same as that of the secondary side DC output voltage Eo.

Then, the activation signal Vt2 is set such that, at time t2 after the secondary side DC output voltage Eo rises up-to and becomes stable at the prescribed level after the rise starts at time t1 as described above, it is changed over from the L level to the H level and outputted as a H level signal.

Consequently, the control IC of the third converter section 203 is activated at time t2. In response to this, the secondary side DC output voltage Eo5 starts its rise from the 0 level later than time t2, and at a point of time when a certain period of time elapses, the secondary side DC output voltage Eo5 is fixed at a prescribed level (200 V).

Further, at time t3 after the secondary side DC output voltage Eo5 is placed into a stabilized state at the prescribed level as described above, the microcomputer changes over the activation signal Vt3 from the L level to the H level. In response to this, the control IC of the second converter section 202 is activated at time t3, and the secondary side DC output voltage Eo4 rises such that it starts its rise from the 0 level after time t3 and is fixed at a prescribed level (70 V) at a point of time when a certain period of time elapses.

In this manner, the power supply circuit shown in FIG. 11 controls the rise time of the secondary side DC output voltage so that appropriate activation operation as a power supply circuit can be obtained.

As can be recognized from the foregoing description, the power supply circuit shown in FIG. 11 as a related art is formed incorporating an active filter having the conventionally known configuration shown in FIGS. 8 and 10 as a basic configuration. Further, in the case of the circuit shown in FIG. 11, three composite resonance type converters are connected in parallel at the next stage to the active filter. Furthermore, a step-down type converter for obtaining the secondary side DC output voltages Eo and Eo2 is provided in the composite resonance type converter of the first converter section 201.

Such a configuration as described above is adopted to achieve improvement of the power factor. Further, the power supply circuit shown in FIG. 11 is ready for a so-called wide range in such a manner that it operates with the AC 100 V system and the AC 200 V system as the commercial AC power supply. Further, the circuit system for constant voltage control by the switching control method and a required number of step-down type converters provided on the secondary side are combined to achieve stabilization of the secondary side DC output voltage.

However, the power supply circuit having the configuration shown in FIG. 11 has the following problem.

The power conversion efficiency of the power supply circuit shown in FIG. 11 is given as a synthesized value of the AC-DC power conversion efficiency ($\eta AC \rightarrow DC$) and the DC-DC power conversion efficiency ($\eta DC \rightarrow DC$) of the current resonance type converters (first, second and third converter sections 201, 202 and 203) at the succeeding stage.

Here, the DC-DC power conversion efficiency ($\eta DC \rightarrow DC$) of the first, second and third converter sections 201, 202 and 203 is approximately 95%.

Meanwhile, the AC-DC power conversion efficiency ($\eta AC \rightarrow DC$) of the active filter is 93% when the AC input voltage VAC=100 V and 95% when the AC input voltage VAC=230 V.

Accordingly, the combined power conversion efficiency is, when the AC input voltage VAC=100 V,

93%×95%=88.3% and when the AC input voltage VAC=230 V,

95%×95%=90.2%

Corresponding to this, the AC input power is 679.5 W when the AC input voltage VAC=100 V, and 665.2 W when the AC input power is 230.

In short, when the AC input voltage VAC=100 V (AC 200 V system), the conversion efficiency on the active filter circuit side drops and the overall efficiency drops when compared with that when the AC input voltage VAC=230 V (AC 100 V system).

Further, it is necessary to design the circuit shown in FIG. 11 such that the AC-DC power conversion efficiency ($\eta AC \rightarrow DC$) of the active filter may maintain 94% to 97%, for example, within the range of AC input voltage VAC=100 V to 230 V so that it may not become lower than the above-described characteristic of the power conversion efficiency under the condition that the load power Po=600 W or more.

Further, while, in the active filter circuit 8, switching operation as a step-up type converter is performed, since the switching operation depends upon dv/di and di/dt and is hard switching operation, the generation level of noise is very high.

Further, since three composite resonance type converters and two step-down type converts are provided at the next stage to the active filter, also switching noise of them is so high that it cannot be ignored. Particularly since the step-down type converters perform hard switching operation, the amount of switching noise generation is great. In contrast, although the composite resonance type converters perform soft switching operation and generates switching noise of a smaller amount than the hard switching converters, since the arrangement includes three composite resonance type converters, the overall noise amount is great as much. From them, a comparatively heavy noise suppression countermeasure is required.

Then, from the necessities described, the power supply circuit shown in FIG. 11 first includes two bridge rectification circuits Di1 and Di2 in the rectification circuit system for rectifying the commercial AC power supply AC.

Further, it is necessary to provide a plurality of power choke coils in the active filter circuit 8. Furthermore, with regard to a semiconductor element for switching, it is necessary to connect a plurality of switching elements (transistors, diodes or the like) in parallel and add a drive circuit so that the switching elements may be driven appropriately. Further, also it is necessary to attach a large-size heat radiating plate to the semiconductor elements.

Furthermore, in the circuit shown in FIG. 11, a line noise filter including two common mode choke coils and three across capacitors is formed for the line of the commercial AC power supply AC. In short, two or more stages of line noise filters are required.

Further, the normal mode noise filter 4 formed from a choke coil LN and three filter capacitors CN is provided for the rectification output line. Furthermore, in the active filter circuit 8, also it is necessary to provide an RC snubber circuit for the switching elements. Particularly in order to be ready for a heavy load as in the case of the circuit of FIG. 11, the resistor which forms the RC snubber is a cement resistor and has a large size.

In this manner, in an actual circuit, a countermeasure against noise based on a very large number of parts is required, and this gives right to increase of the cost and increase of the mounting area of the power supply circuit board.

Furthermore, in the circuit shown in FIG. 11, it is considered that three kinds of switching converters exist in a mixed manner. In particular, they are a step-up type converter in the active filter circuit 8, a composite resonance type converter which forms the first to third converter sections 201 to 203 and a step-down type converter added to the first converter section 201.

In this instance, while the switching frequency of the step-up converter of the active filter circuit 8 is 50 KHz, the switching frequency of the composite resonance type converters of the first to third converter sections 201 to 203 is within the range from 70 KHz to 150 KHz. Further, the step-down converter of the first converter section 201 has a switching frequency of, for example, 100 KHz.

Where the switching frequencies of the switching converters are different from each other in this manner, there is a problem also that the ground potentials of the primary side and the secondary side interfere with each other and the operation of the power supply circuit is liable to be rendered unstable.

Further, the power supply circuit shown in FIG. 11 has a configuration that it includes the three converter sections 201, 202 and 203 each in the form of a composite resonance type converter. This arises from the fact that, as described hereinabove with reference to FIG. 12, in this instance, the rising timing of the secondary side DC output voltage must be controlled at the three stages of the times t1, t2 and t3.

In short, the starting signal is outputted as a signal (activation control signal) for activating the control IC 2. Accordingly, in order to implement a starting sequence of the secondary side DC output voltage corresponding to the times t1, t2 and t3 illustrated in FIG. 12, three control ICs which are activated in response to the starting voltages Vt1, Vt2 and Vt3 are required correspondingly. Therefore, three composite resonance type converters are provided corresponding to the three control ICs 2, and secondary side DC output voltages to be produced by the three composite resonance type converters are allocated in accordance with the order of the required starting sequence.

However, with the configuration wherein the secondary side DC output voltages are successively started in such a manner as described above, a number of control ICs corresponding to the number of starting signals are required, and accordingly, a number of converter sections corresponding to the number of starting signals are required. In short, this signifies that, in response to an increase of the number of stages of a starting sequence of secondary side DC output voltages, also it is necessary to increase the number of converter sections.

This gives rise to a disadvantage that, if it is tried to cope with an increase of the number of stages of a starting sequence of secondary side DC output voltages, then the number of converter sections increases only for this, and as a result, the number of components of the converter sections beginning with a control IC, an insulating converter transformer PIT, a switching element and so forth increases exceeding a necessary number. Such increase of the number of converter sections is not preferable because it results in increase in size and weight of a power supply circuit board. Further, where the converter sections increase, also the switching loss of the primary side switching elements increases correspondingly, and this is disadvantageous also in power conversion efficiency.

DISCLOSURE OF INVENTION

Therefore, according to the present invention, taking the subject described above into consideration, a switching power supply circuit is configured in the following manner.

In particular, the switching power supply circuit of the present invention receives a commercial AC power supply as an input thereto to produce a rectification smoothed voltage and includes a rectification smoothing section operable in response to the level of the inputted commercial AC power supply for performing changeover between an equal voltage rectification operation of producing a rectification smoothed voltage of a level equal to that of the commercial AC power supply and a voltage doubler rectification operation of producing the rectification smoothed voltage of a level equal to twice that of the commercial AC power supply, and a plurality of switching converter sections for receiving and operating with the rectification smoothed voltage as a DC input voltage.

Each of the plurality of switching converter sections includes a switching section for receiving the DC input voltage to perform switching operation, the switching section being formed from a high side switching element and a low side switching element connected in a half-bridge connection, and a switching driving section for switching driving the switching elements.

Each of the plurality of switching converter sections further includes an insulating converter transformer formed by winding at least a primary winding to which a switching output obtained by the switching operation of the switching section is supplied and a secondary winding in which an alternating voltage as a switching output obtained in the primary winding is excited.

Each of the plurality of switching converter sections further includes a primary side series resonance circuit formed at least from a leakage inductance component of the primary winding of the insulating converter transformer and a capacitance of a primary side series resonance capacitor connected in series to the primary winding for making operation of the switching section that of a current resonance type, and a primary side partial voltage resonance circuit formed from a capacitance of a partial voltage resonance capacitor connected in parallel to one of the two switching elements each of which forms the half bridge connection and a leakage inductance component of the primary winding of the insulating converter transformer, voltage resonance operation of the primary side partial voltage resonance circuit being obtained only in response to each of timings at which each of the switching elements turns on and turns off.

Each of the plurality of switching converter sections further includes a DC output voltage production section for receiving a secondary side AC voltage obtained by the secondary winding of the insulating converter transformer and performing rectification operation of the received secondary side AC voltage to produce a plurality of secondary side DC output voltages.

Each of the plurality of switching converter sections further includes a frequency control type fixed voltage control section for controlling the switching driving section in response to a level of a required one of the plurality of secondary side DC output voltages to vary the switching frequency of the switching section to perform fixed voltage control for the required one of the secondary side DC output voltages.

Each of the plurality of switching converter sections further includes an inductance control type fixed voltage control section provided for each of required ones of the secondary side DC output voltages which are required to be fixed voltages other than the required one of the secondary side DC output voltages which is an object of the fixed voltage control by the frequency control type fixed voltage control section, the inductance control type fixed voltage control section being configured such that a controlled winding of a control transformer in the form of a saturable reactor having a control winding and the controlled winding wound thereon is inserted in a secondary side rectification current path for producing the secondary side DC output voltage and a control current level to be supplied to the control winding is varied in response to the inputted secondary side DC output voltage level to vary the inductance of the controlled winding thereby to perform fixed voltage control for the secondary side DC output voltage.

Each of the plurality of switching converter sections further includes a switch section for operating, at a timing after predetermined time elapses after a predetermined secondary side DC output voltage rises, to change over the secondary side rectification current path for producing another predetermined secondary side DC output voltage from an off state to an on state.

Each of the plurality of switching converter sections further includes a power factor improving circuit for improving the power factor. The power factor improving circuit includes a power factor improving transformer formed by winding a power factor improving primary winding inserted in series in the primary side series resonance circuit and a power factor improving secondary winding inserted in a rectification current path formed as the rectification smoothing section, and a rectification element inserted in a required location of the rectification current path for performing switching operation based on an excited voltage excited in the power factor improving secondary winding by the power factor improving primary winding to interrupt the rectification current.

The switching power supply circuit of the present invention having the configuration described above includes, in order to be ready for a heavy load condition, a plurality of switching converter sections which receive and operate with a rectification smoothed voltage (DC input voltage).

Each of the switching converter sections has a configuration that a partial voltage resonance circuit is combined with a current resonance type converter of the half bridge connection type.

Meanwhile, as regards power factor improvement, the power factor is improved by a configuration that the voltage of a switching output of a composite resonance type converter is fed back to the rectification current path by a power factor improving transformer having a loose coupling and the rectification current is interrupted by a rectification diode thereby to expand the conduction angle of the AC input current to achieve power factor improvement.

Then, in order to allow the switching power supply circuit to be ready for a wide range, changeover of the rectification operation of the rectification smoothing section for producing the rectification smoothed voltage (DC input voltage) is performed between an equal voltage rectification operation and a voltage doubler rectification operation in response to the commercial AC power supply level.

Consequently, for example, if it is tried to configure a power supply circuit which includes, for example, a power factor improving circuit so as to be ready for a wide range, then there is no necessity to provide an active filter for stabilizing the DC input voltage to a switching converter.

Further, while the switch section changes over the secondary side rectification current path from an off state to an on stage, this operation is an operation of raising the secondary side DC output voltage produced by the secondary side rectification current path from the state of the zero level to a prescribed level. The operation of changing over the secondary side rectification current path from an off state to an on state is performed at a timing after lapse of predetermined time after a predetermined one of the plurality of secondary side DC output voltages rises. In other words, it is possible to successively start the plurality of secondary side DC voltages while the starting timings are controlled.

From this, the present invention adopts a configuration that a switching power supply circuit ready for a wide range including a power factor improving function does not include an active filter. Consequently, the switching power supply circuit has an effect that the power conversion efficiency is improved when compared with an alternative case wherein it is tried to improve the power factor, for example, by means of an active filter.

Further, the switching power supply circuit of the present invention eliminates the necessity for a large number of part elements for configuring an active filter. Further, since the current resonance type converter and the power factor improving circuit which configure the power supply circuit perform soft switching operation and the switching noise is reduced significantly, also the necessity for reinforcing a noise filter is eliminated.

Therefore, when compared with the related art, the number of parts is reduced significantly, and consequently, reduction in size/weight of the power supply circuit can be anticipated. Also the cost can be reduced as much.

While the switching power supply circuit according to the present invention is particularly ready for a heavy load condition, since an active filter which is ready for a heavy load requires a greater number of parts, the effect of reduction in size and weight and reduction of the cost of the circuit is very effective.

Furthermore, since the active filter is eliminated, the interference between the ground potentials on the primary side and the secondary side is eliminated, the ground potential is stabilized and the reliability is enhanced.

Further, the related art is configured, in order to implement a starting sequence prescribed for a plurality of secondary side DC output voltages, such that the control ICs (switching driving sections) of the individual switching converter sections are activated with starting signals. Therefore, the related art requires provision of a number of switching converter sections corresponding to the number of stages at which the secondary side DC output voltages are to be started, that is, the number of starting signals (activation control signals).

In contrast, according to the present invention, the switching power supply circuit includes a switch section to make it possible to successively start a plurality of secondary side DC voltages while the starting timings are controlled. Consequently, the necessity for the provision of a number of switching converter sections equal to the number of stages at which the secondary side DC output voltages are to be started is eliminated, and as occasion demands, the number of switching converter sections can be reduced when compared with that of the related art. Also by this, reduction of the number of part elements and resulting reduction in size and weight as well as reduction of the cost can be anticipated, and also reduction of the switching loss can be anticipated as a result of the reduction of the number of switching converter sections.

BEST MODE FOR CARRYING OUT THE INVENTION

Figure 1:
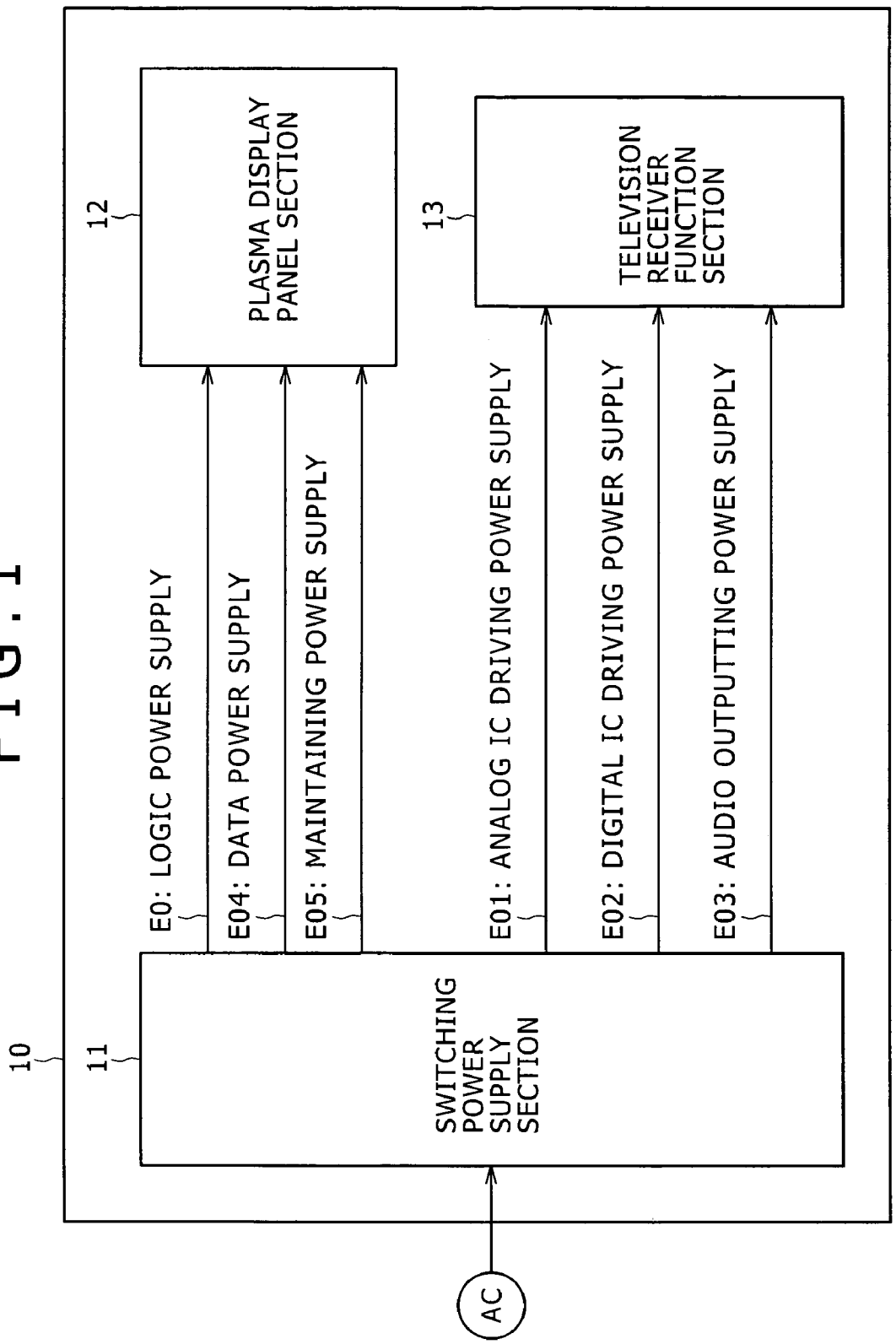
FIG. 1 is a block diagram showing an example of a configuration of a plasma display apparatus as an embodiment of the present invention.

FIG. 1 shows an example of an internal configuration of a plasma display apparatus configured incorporating a switch power supply circuit as an embodiment of the present invention in connection with a relationship between a power supply section and a functional circuit section.

From the point of view of a relationship between the power supply section and the functional circuit section, the plasma display apparatus 10 as an embodiment shown in FIG. 1 can be considered to be composed of a switching power supply circuit 11, a plasma display panel section 12 and a television reception function section 13.

The switching power supply circuit 11 receives a commercial AC power supply AC as an input thereto as seen in FIG. 1 to perform switching operation in such a manner as hereinafter described to output DC voltages Eo, Eo1, Eo2, Eo3, Eo4 and Eo5 as operating power supplies for the plasma display panel section 12 and the television reception function section 13 in accordance with predetermined load conditions.

Incidentally, the switching power supply circuit 11 corresponds to a switching power supply circuit as the present embodiment hereinafter described with reference to FIGS. 2 and 6, and the DC power supply voltages Eo, Eo1, Eo2, Eo3, Eo4 and Eo5 are obtained as secondary side DC output voltages on the secondary side of the switching power supply circuit of the embodiment. Accordingly, the block configuration shown in FIG. 1 is a configuration common to first and second embodiments hereinafter described.

The plasma display panel section 12 is a block which includes a display device as a plasma display device and displays an image.

As a principle of display of a plasma display device, for example, gas is enclosed in a space formed between two glass substrates disposed in an opposing relationship to each other and a voltage is applied to the gas to cause vacuum discharge. Consequently, in the space between the glass substrates, the gas is ionized into a plasma state and emits ultraviolet rays. Here, if a fluorescent material layer is formed in the space between the glass substrates, then when the ultraviolet rays are illuminated on the fluorescent material layer, visible rays of a predetermined color are emitted from the fluorescent material layer. If fluorescent materials corresponding to the three colors of R, G and B are formed as such so that the discharge light emitting phenomenon described above may be obtained for each of display cells formed, for example, in a matrix, the color image display can be implemented.

Further, as one of methods for driving such a plasma display apparatus as described above to display, a subfield method is known.

The subfield method is a driving method wherein the light emitting period of display cells is controlled for each subfield to represent a gradation (luminance) of each display cell. Further, in order to drive the display cells to display in this manner, those display cells whose data line is to be driven to emit light every time line scanning is performed and a sustain pulse is applied within each subfield period. Thereupon, where the gradation of the display cells of R, G and B which form one pixel is controlled, not only the gradation balance of the overall screen but also color reproduction of each one pixel is performed. In short, a color image can be represented.

As an example of an internal structure of the plasma display panel section 12, it includes a display panel section on which the display cells are disposed, a data driving circuit for driving data lines in accordance with image data for performing display by the subfield method, and a sustain pulse driving circuit for applying a sustain pulse. Further, the plasma display panel section 12 includes a control section for controlling operation control thereof. The control section executes various controls regarding image display operation of the plasma display panel section 12. For example, the control section determines what subfield pattern is to be used in accordance with image data inputted thereto and controls driving operation of the data driving circuit and the sustain pulse driving circuit based on the determined subfield pattern. Further, while luminance control called PLE (Peak Luminance Enhancement) control is executed in order to achieve enhancement of the picture quality of a display image and reduction of the power consumption in such a manner as well known in the art, also an arithmetic operation processing for the PLE control and like processes are executed by the control section.

The plasma display apparatus 10 in this instance includes also functions as a television receiver which receives and displays a television broadcast. In short, the plasma display apparatus 10 has functions of selecting an object channel from among received broadcasting waves and demodulating a video signal/audio signal of the channel. The television reception function section 13 is a functional circuit section for the functions.

Thus, the television reception function section 13 includes a tuner (front end) for receiving and selecting a predetermined kind of a broadcasting wave (for example, a type such as a ground wave or a satellite broadcast), a decoder for demodulating a video signal/audio signal from among the signals received and selected by the tuner, and so forth.

A video signal obtained by the demodulation process performed by the television reception function section 13 is converted into video signal data and inputted to the plasma display panel section 12. Consequently, the plasma display panel section 12 performs image display of the television broadcast. Meanwhile, a demodulated audio signal is inputted to an audio signal outputting circuit system provided in the same television reception function section 13 so that it is outputted as sound, for example, from a speaker or the like.

In this instance, while the six DC power supply voltages Eo, Eo1, Eo2, Eo3, Eo4 and Eo5 are obtained in such a manner as described hereinabove from the switching power supply circuit 11, the DC voltages are utilized as power supply voltages ready for the following load conditions.

First, from among the six DC power supply voltages Eo, Eo1, Eo2, Eo3, Eo4 and Eo5, the DC power supply voltages Eo, Eo4 and Eo5 are supplied to the plasma display panel section 12.

Since the DC output voltage Eo is called logic power supply, it is a power supply to be supplied to an IC as a control circuit of the plasma display panel section 12 and so forth.

Meanwhile, the DC power supply voltage Eo4 is called data power supply and is a power supply to be supplied to the data line driving circuit for driving the data lines.

The DC power supply voltage Eo5 is called sustain power supply and is used as a power supply for allowing the sustain pulse described hereinabove to be outputted. In short, the DC power supply voltage Eo5 is a power supply to be supplied for the sustain pulse driving circuit.

The remaining DC power supply voltages Eo1, Eo2 and Eo3 are supplied to the television reception function section 13. The DC power supply voltage Eo1 is called analog IC driving power supply and is supplied as a power supply for an IC (Integrated Circuit) which includes, for example, a tuner and so forth. A television receiver in recent years is inclined to perform, for example, a demodulation processing of a received and selected signal and various video/audio signal processes by digital signal processing, and includes an IC for a digital signal processor or the like for the digital signal processing. Also the television reception function section 13 includes such a digital IC as just described, and the DC power supply voltage Eo2 is a power supply to be supplied to the digital IC. In other words, the DC power supply voltage Eo2 serves as a digital IC driving power supply.

The DC power supply voltage Eo3 is called audio outputting power supply and is a power supply to be supplied to an audio outputting circuit system for outputting an audio signal.

Figure 2:
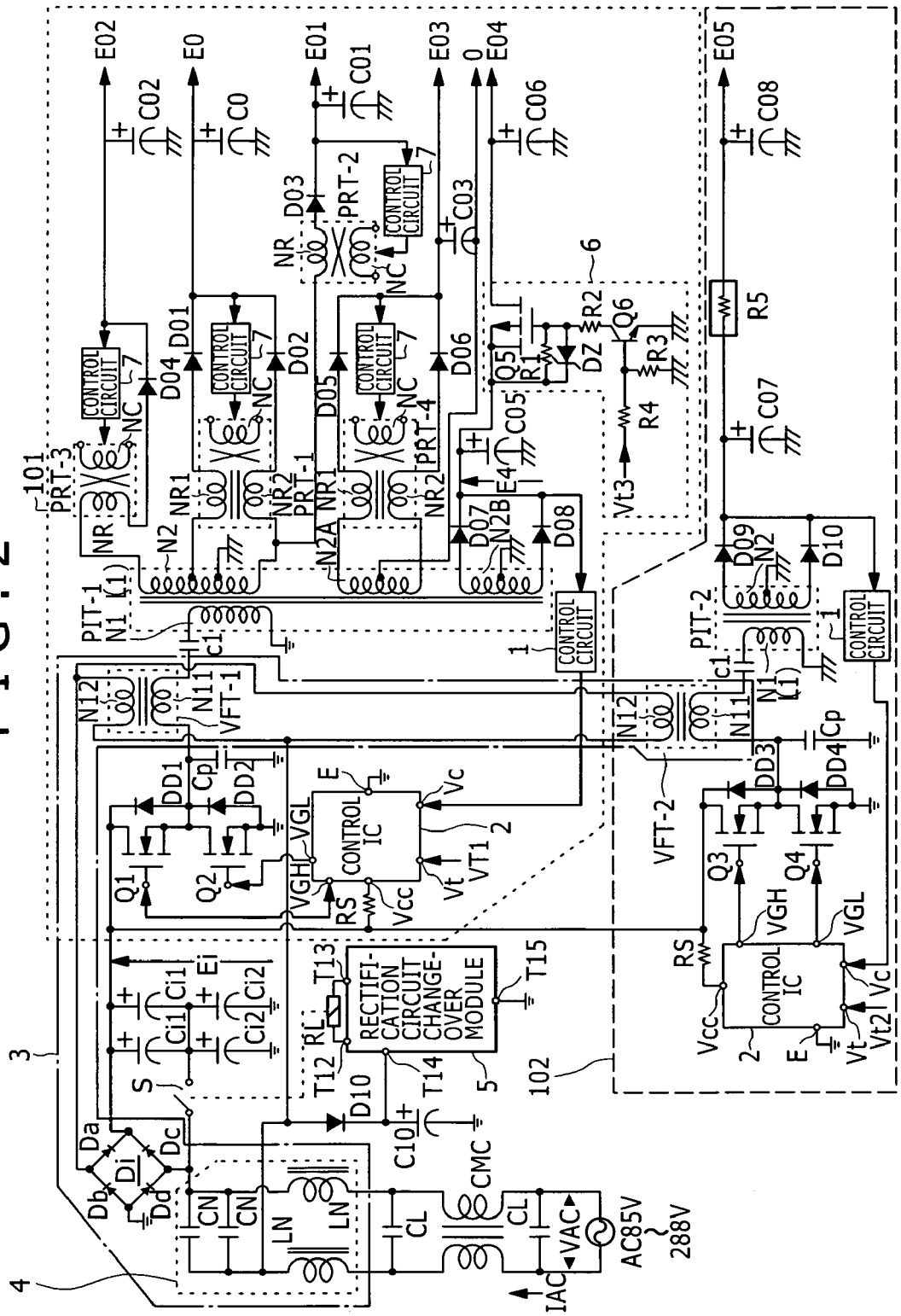
FIG. 2 is a circuit diagram showing an example of a configuration of a switching power supply circuit as a first embodiment of the present invention.

FIG. 2 shows an example of a configuration of a switching power supply circuit of a first embodiment of the present invention as a switching power supply circuit which can be applied to the switching power supply circuit 11 shown in FIG. 1. The power supply circuit shown in FIG. 2 adopts a configuration which can be ready for the load power Po=600 W or more and operates with the AC 100 V system and the AC 200 V system of commercial AC power supply so that it is ready for a wide range.

In particular, the plasma display apparatus 10 as the present embodiment has so-called worldwide specifications such that it can operate in both of regions of the AC 100 V system of commercial power supply such as, for example, Japan and the United States and regions of the AC 200 V system such as Europe. Further, the power specification of the entire plasma display apparatus is generally 600 W or more.

In the power supply circuit shown in FIG. 2, a line filter formed from one common mode choke coil CMC and two across capacitors CL is provided for a commercial AC power supply AC. In other words, in this instance, only one line noise filter is provided for removing common mode noise.

Further, choke coils LN, LN are inserted in series individually in positive/negative lines of the commercial AC power supply AC at a stage next to the line noise filter. Two filter capacitors CN//CN connected in parallel are connected between the choke coils LN, LN and a node between a positive input terminal/negative input terminal of a bridge rectification circuit Di.

A normal mode noise filter 4 is formed from the choke coils LN, LN and the filter capacitors CN//CN and suppresses normal mode noise generated in a rectification current path of the commercial AC power supply. The normal mode noise filter 4 forms part of a power factor improving circuit 3.

The power supply circuit of the present embodiment has a configuration wherein the power factor improving circuit 3 formed including a rectification circuit system is connected to the commercial AC power supply AC. As shown in the figure, the power factor improving circuit 3 includes the bridge rectification circuit Di, smoothing capacitors Ci1, Ci1, Ci2, Ci2, filter capacitors CN//CN and loose coupling transformers (power factor improving transformers) VFT-1 and VFT-2. The loose coupling transformer VFT-1 is provided corresponding to a first converter section 101, and the loose coupling transformer VFT-2 is provided corresponding to a second converter section 102.

The positive input terminal of the bridge rectification circuit Di is connected to the positive line of the commercial AC power supply AC through a negative connection circuit of secondary windings YN12 of the loose coupling transformers VFT-1 and VFT-2. Meanwhile, the negative input terminal of the bridge rectification circuit Di is connected to the negative line of the commercial AC power supply AC.

The positive output terminal of the bridge rectification circuit Di is connected to the positive side of a smoothing circuit formed from the smoothing capacitors Ci1, Ci1, Ci2, Ci2. Further, the positive output terminal of the bridge rectification circuit Di is connected to the primary side ground.

In this instance, the smoothing circuit formed from the smoothing capacitors Ci1, Ci1, Ci2, Ci2 are formed in the following manner. In particular, two series connection circuits of the smoothing capacitors Ci1-Ci2 are connected in parallel.

The positive terminals of the smoothing capacitors Ci1//Ci1 which are in the parallel connection relationship are connected to the positive output terminal of the bridge rectification circuit Di. Nodes between the negative terminals of the smoothing capacitors Ci1//Ci1 and the positive terminals of the smoothing capacitors Ci2//Ci2 are connected to the negative input terminal of the bridge rectification circuit Di through a relay switch S. The relay switch S is turned on/off in response to a driving state of a relay RL connected to a rectification circuit changeover module 5.

The rectification circuit changeover module 5 is provided to drive the relay RL to change over operation of the rectification circuit system formed in such a manner as described above between the AC 100 V system and the AC 200 V system. To this end, a DC voltage obtained by half-wave rectification of the commercial AC power supply AC by means of a diode D10 and a capacitor C10 is inputted as a detection voltage to a detection terminal T14. The DC voltage level inputted from the detection terminal T14 exhibits a variation in accordance with the level of the commercial AC power supply AC (AC input voltage VAC). In short, the rectification circuit changeover module 5 detects the level of a rectification smoothed voltage Ei to detect the level of the commercial AC power supply AC.

The relay RL is connected between relay driving terminals T12 and T13. It is to be noted that the relay RL controls the relay switch S on/off in accordance with the conduction state of the relay RL itself. It is to be noted here that, when the relay RL is in a conducting state, the relay switch S is on, and when the relay RL is in a non-conducting state, the relay switch S is off.

Meanwhile, a terminal T15 is a terminal for grounding the ground line of the rectification circuit changeover module 5 to the primary side ground.

Changeover operation of the rectification circuit system having the configuration described above is such as follows.

The rectification circuit changeover module 5 compares the level of the AC input voltage VAC inputted to the detection terminal T14 with a predetermined reference voltage. When the AC input voltage VAC is VAC=150 V or more, the voltage level inputted to the detection terminal T14 is equal to or higher than the reference voltage, but when the AC input voltage VAC is lower than 150 V, the voltage level inputted to the detection terminal T14 is lower than the reference voltage. In other words, the reference voltage has a level corresponding to the AC input voltage VAC=150 V.

Then, the rectification circuit changeover module 5 drives the relay RL such that, when the level of the inputted DC voltage is lower than the reference voltage, the relay RL is on, but when the level of the inputted DC voltage is equal to or higher than the reference voltage, the relay RL is off.

Here, it is assumed that, for example, a level corresponding to the AC input voltage VAC=150 V or more is inputted corresponding to the AC 200 V system.

In this instance, since the voltage level inputted to the detection terminal T14 is higher than the reference voltage, the rectification circuit changeover module 5 turns off the relay RL. In response to this, also a relay switch S1 is turned off (open).

When the relay switch S1 is in an off state, operation that, within both periods within which the AC input voltage VAC is positive/negative, the AC input voltage VAC is rectified by the bridge rectification circuit Di to charge rectification current into the parallel circuit of the two sets of smoothing capacitors [Ci1-Ci2]//[Ci1-Ci2] each connected in series. This is rectification operation by a normal full-wave rectification circuit which includes a bridge rectification circuit. Consequently, a rectification smoothed voltage Ei equal to the AC input voltage VAC is obtained as a voltage across of the smoothing circuit formed from the smoothing capacitors [Ci1-Ci2]//[Ci1-Ci2].

In contrast, it is assumed that a rectification smoothed voltage Ei of a level corresponding to a voltage lower than the AC input voltage VAC=150 V is generated corresponding to the AC 100 V system.

In this instance, since the voltage level inputted to the detection terminal T14 is lower than the reference voltage and the rectification circuit changeover module 5 drives the relay RL so as to be on, the relay switch S1 is controlled so as to be on. (closed).

When the relay switch S1 is in an on state, within a period in which the AC input voltage VAC is positive, a rectification current path along which a rectification output of the bridge rectification circuit Di is used to charge only the parallel connection circuit of the smoothing capacitors Ci1//Ci1 is formed. On the other hand, within another period within which the AC input voltage VAC is negative, another rectification path by which the rectification output of the bridge rectification circuit Di is used to charge only the parallel connection circuit of the smoothing capacitors Ci2//Ci2.

Since the rectification operation is performed in this manner, a level equal to the AC input voltage VAC is generated as a voltage across the parallel resonance circuit of the smoothing capacitors Ci1//Ci1 and Ci2//Ci2. Accordingly, a level equal to twice the AC input voltage VAC is obtained as a voltage across the parallel connection circuits of the smoothing capacitors Ci1//Ci1 and Ci2//Ci2. In other words, a so-called voltage doubler rectification circuit is formed.

In this manner, the circuit shown in FIG. 2 performs voltage doubler rectification operation to produce a rectification smoothed voltage Ei equal to twice the AC input voltage VAC where the commercial AC power supply AC is the AC 100 V system, but performs equal voltage rectification operation, for example, by a full wave rectification circuit to produce a rectification smoothed voltage Ei equal to the AC input voltage VAC where the commercial AC power supply AC is the 200 V system. In other words, the rectification smoothed voltage Ei of an equal level is obtained irrespective of whether the commercial AC power supply AC is the AC 100 V system or the AC 200 V system, and this makes the circuit shown in FIG. 2 ready for a wide range. The rectification smoothed voltage Ei is inputted as a DC input voltage to the switching converter at the next stage.

It is to be noted that, if it is tried to merely perform changeover between the voltage doubler rectification operation and the full-wave rectification operation, then this is possible also with one parallel connection circuit of, for example, the smoothing capacitors Ci1-Ci2.

The reason why two parallel connection circuits of the smoothing capacitors Ci1-Ci2 are connected in parallel in the present embodiment is that the power supply circuit of the present embodiment is ready for the heavy load condition of the load power Po=600 W or more. As the load condition becomes heavier, the current flowing into the capacitor which forms the smoothing circuit in the rectification circuit system increases. Therefore, where smoothing capacitors are connected in parallel as in the present embodiment, rectification current to flow to the smoothing capacitors is branched. In short, the current level flowing to one smoothing capacitor is suppressed and the burden on each smoothing capacitor is reduced.

It is to be noted that power factor improving operation of the power factor improving circuit 3 of the present embodiment formed including such a rectification circuit system as described above is hereinafter described.

The circuit shown in FIG. 2 includes two switching converters which operate receiving the DC input voltage (rectification smoothed voltage Ei) obtained as a voltage across the smoothing circuit (smoothing capacitors [Ci1-Ci2]//[Ci1-Ci2]) described above as an input thereto, that is, the first converter section 101 and the second converter section 102 as seen in FIG. 2. The first converter section 101 and the second converter section 102 are connected in parallel to each other to the DC input voltage (rectification smoothed voltage Ei).

Further, the first converter section 101 and the second converter section 102 individually have a configuration as a composite resonance type capacitor which includes a primary side partial voltage resonance circuit in addition to a current resonance type converter of the separately excited half bridge type. Further, the first converter section 101 and the second converter section 102 are configured also such that they include the loose coupling transformers VFT-1 and VFT-2, which form the power factor improving circuit 3 of the voltage feedback type to achieve power factor improvement.

Here, a configuration of the first converter section 101 is described.

The first converter section 101 has a basic configuration as a current resonance type converter as described hereinabove. Further, as show in FIG. 2, two switching elements Q1 (high side) and Q2 (low side) each in the form of a MOS-FET are connected to each other by a half bridge connection as seen in FIG. 2. The circuit of the switching elements Q1 and Q2 by a half bridge connection is connected in parallel to the rectification smoothed voltage Ei.

Further, damper diodes DD1 and DD2 are connected in parallel in a direction indicated in FIG. 2 between the drain-source of the switching elements Q1 and Q2.

A partial resonance capacitor Cp is connected in parallel between the drain-source of the switching element Q2. The capacitance of the partial resonance capacitor Cp and the leakage inductance L1 of the primary winding N1 cooperatively form a parallel resonance circuit (partial voltage resonance circuit). Then, partial voltage resonance operation wherein voltage resonance occurs only upon turning on of the switching elements Q1 and Q2 is obtained.

A control IC 2 includes an oscillation circuit for driving the current resonance type converter in a separately excited fashion, a control circuit, a protection circuit and so forth and is formed as an analog IC (Integrated Circuit) for universal use including a bipolar transistor inside therein.

The control IC 2 operates with a DC voltage inputted to a power supply input terminal Vcc. In this instance, the rectification smoothed voltage Ei is inputted to the power supply input terminal Vcc through a resistor Rs.

Further, the control IC 2 is grounded to the primary side ground through a ground terminal E.

Further, the control IC 2 includes two drive signal output terminals VGH and VGL as terminals for outputting a drive signal (gate signal) to the switching elements.

A drive signal for switching driving the high side switching element is outputted from the drive signal output terminal VGH, and another drive signal for switching driving the low side switching element is outputted from the drive signal output terminal VGL.

In this instance, the drive signal outputted from the drive signal output terminal VGH is applied to the gate of the high side switching element Q1. Meanwhile, the drive signal outputted from the drive signal output terminal VGL is applied to the gate of the low side switching element Q2.

Further, though not shown in FIG. 2, a boot strap circuit is provided as an externally provided circuit for the control IC 2. The drive signal for the high side outputted from the drive signal output terminal VGH is level shifted by the boot strap circuit so that it has a level with which it can appropriately drive the switching element Q1.

In the control IC 2, an oscillation signal of a required frequency is produced by an oscillation circuit therein. It is to be noted that the oscillation circuit adjusts the frequency of the oscillation signal in response to the level of a control output inputted from a control circuit 1 to a terminal Vc as hereinafter described.

Thus, the control IC 2 makes use of the oscillation signal produced by the oscillation circuit to produce a drive signal for the high side and another drive signal for the low side. The drive signal for the high side is outputted from the drive signal output terminal VGH, and the signal for the low side is outputted from the drive signal output terminal VGL.

According to the described above, the drive signal for the high side outputted from the drive signal output terminal VGH is applied to the switching element Q1. Consequently, a gate-source voltage VGH1 of the switching element Q1 is obtained with a waveform suitable for the drive signal for the high side.

Figure 3:
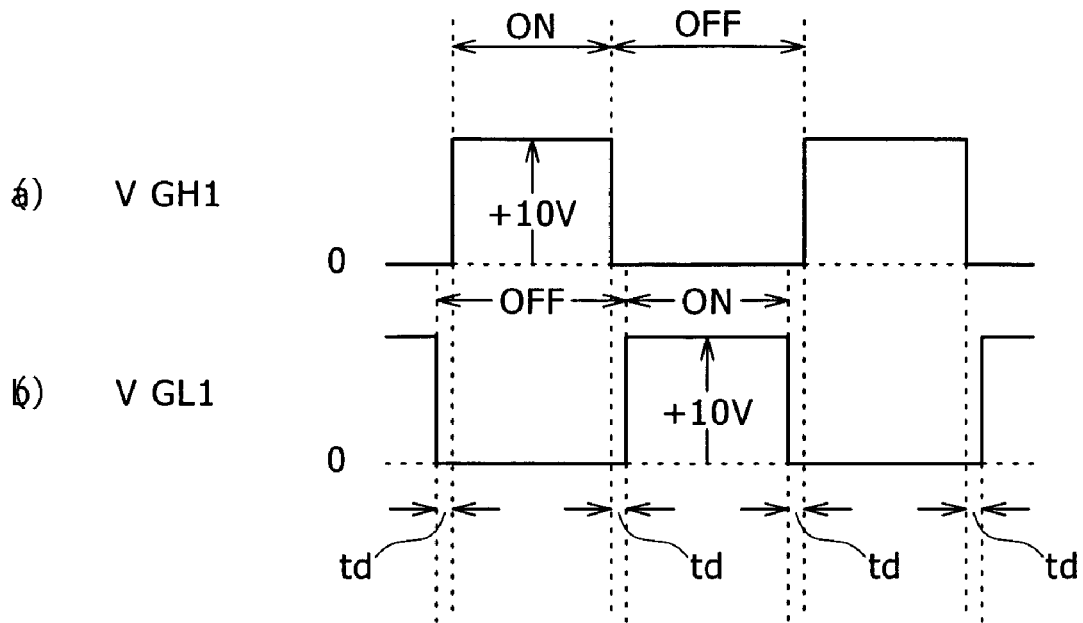
FIGS. 3(a) and 3(b) are waveform diagrams illustrating driving timings of switching elements by a control IC of the embodiment.

In short, as shown in (a) of FIG. 3, a period within which a pulse of a rectangular wave of the positive polarity and another period within which 0 V is generated are obtained within one switching period.

Then, with the gate-source voltage VGH1 illustrated in (a) of FIG. 3, the switching element Q1 is first placed into an on state at a timing at which a rectangular wave pulse of the positive polarity is obtained within one switching period. In particular, in order for the switching element Q1 to be placed into an on state, it is necessary for a voltage of an appropriate level equal to or higher than a gate threshold voltage ($\approx 5$ V) to be applied. Since the gate-source voltage VGH1 as a pulse of the positive polarity described hereinabove is set so as to be 10 V, a state wherein the switching element Q1 is on is obtained corresponding to a period within which a pulse of the positive polarity is applied. Then, when the gate-source voltage VGH1 becomes 0 V and lower than the gate threshold voltage, the switching element Q1 is changed over to an off state. The switching element Q1 performs switching operation by turning on/off at such timings as described above.

On the other hand, the drive signal for the low side outputted from the drive signal output terminal VGL, is applied to the switching element Q2. In response to the drive signal, a gate-source voltage VGL1 of the switching element Q2 having a waveform shown in (b) of FIG. 3 is obtained.

In particular, the gate-source voltage VGL1 has a waveform same as that of the gate-source voltage VGH1 of the switching element Q1 shown in (a) of FIG. 3 but has, as regards the timing, a phase difference of 180° with respect to the gate-source voltage VGH1. From this, the switching element Q2 is switching driven at timings at which it is turned on/off alternatively with the switching element Q1.

According to (a) and (b) of FIG. 3, a period td is formed between a period after the switching element Q1 is turned off until the switching element Q2 is turned on and another period after the switching element Q2 is turned off until the switching element Q1 is turned on.

The period td is dead time within which both of the switching elements Q1 and Q2 are off. The period td as the dead time is formed in order to make it possible to obtain charging and discharging operations of the partial resonance capacitor Cp with certainty within a short period between the times at which the switching elements Q1 and Q2 are turned on/turned off as partial voltage resonance operation. The time length of the period td can be set, for example, by the control IC 2 side. The control IC 2 adjusts the duty ratio of the pulse width regarding the drive signals to be outputted from the drive signal output terminals VGH and VGL so that the period td of a set time length may be formed.

An insulating converter transformer PIT-1 transmits switching outputs of the switching elements Q1 and Q2 to the secondary side and has a primary winding N1 and a secondary winding of a predetermined number of turns.

The primary winding N1 of the insulating transformer PIT-1 in this instance is connected at one end thereof to a node (switching output point) of the source of the switching element Q1 and the drain of the switching element Q2 through a series connection of a primary side DC resonance capacitor C1 and a primary winding N11 of the loose coupling transformer VFT-1. The primary winding N1 is connected at the other end thereof to the primary side ground.

Further, a primary side series resonance circuit is formed from the capacitance of the primary side DC resonance capacitor C1 and a leakage inductance L1 of the insulating converter transformer PIT-1 including the primary winding N1. Since the primary side series resonance circuit is connected to the switching output point in such a manner as described above, the switching output of the switching elements Q1 and Q2 is transmitted to the primary side series resonance circuit. The primary side series resonance circuit performs resonance operation in response to the switching output transmitted thereto. Consequently, operation of the primary side switching converter becomes that of the current resonance type.

According to the description above, operation of the current resonance type by the primary side series resonance circuit (L1-C1) and partial resonance operation by the partial voltage resonance (Cp//L1) are obtained by the primary side switching converter shown in FIG. 2.

In other words, the first converter section 101 shown in FIG. 2 adopts a configuration as a composite resonance type converter which includes a resonance circuit for making the primary side switching converter that of the resonance type in combination with another resonance circuit.

Although description with reference to the drawings is omitted, the insulating converter transformer PIT-1 is structured such that it includes, for example, an EE type core which is formed from a combination of E type cores made of a ferrite material. Further, a wiring receiving portion of the insulating converter transformer PIT-1 is divided into winding receiving portions for the primary side and the secondary side, and the primary winding N1 and the secondary winding are wound on a central magnetic leg of the EE type core.

In the insulating converter transformer PIT in this instance, three windings including secondary windings N2, N2A and N2B are wound independently each other.

First, the secondary side DC output voltages Eo, Eo1 and Eo2 are produced from the secondary winding N2. A circuit system for producing the secondary side DC output voltage Eo from among the secondary side DC output voltages Eo, Eo1 and Eo2 has the following configuration.

In particular, a tap output formed on the secondary winding N2 is grounded to the secondary side ground, and the opposite end taps are led out one by one from positions of the secondary winding N2 at a predetermined number of turns from the center position determined as the tap output. Then, rectification diodes Do1 and Do2 are connected to the opposite end taps through series connections of controlled windings NR1 and NR2 of an orthogonal control transformer PRT-1, respectively, and a smoothing capacitor Co is further connected to form a full-wave rectification circuit. From the full-wave rectification circuit, the secondary side DC output voltage Eo is obtained as a voltage across the smoothing capacitor Co.

Here, the secondary side DC output voltage Eo is branched and inputted to a control circuit 7 for the stabilization.

The orthogonal control transformer PRT-1 is configured such that a control winding Nc and the controlled windings NR1 and NR2 are wound on the core such that, for example, the winding direction of the controlled windings NR1 and NR2 is perpendicular to that of the control winding Nc. The orthogonal control transformer PRT-1 formed in this manner becomes a saturable reactor.

The control circuit 7 in this instance outputs DC current, whose level is varied in response to the level of the secondary side DC output voltage Eo, as control current. In the orthogonal control transformer PRT-1 which is a saturable reactor, the inductances of the controlled windings NR1 and NR2 are varied in response to a variation of the control current level. Since the controlled windings NR1 and NR2 are inserted in series in the rectification circuit system for the secondary side DC output voltage Eo, if the inductance of the controlled windings NR1 and NR2 changes, then the rectification current amount to flow into the smoothing capacitor Co changes and consequently the level of the secondary side DC output voltage Eo changes. In this manner, constant voltage control is performed by variably controlling the level of the secondary side DC output voltage Eo.

Meanwhile, the rectification circuit system for the secondary side DC output voltage Eo1 is formed as a half-wave rectification circuit by connecting a controlled winding NR-rectification diode Do3 of an orthogonal control transformer PRT-2 in series to a line led out from one end portion of the secondary winding N2 as seen in FIG. 2 and connecting a smoothing capacitor Co1.

Also the rectification circuit system for the secondary side DC output voltage Eo1 includes an orthogonal control transformer PRT-2 and a control circuit 7 to control the secondary side DC output voltage Eo1 so as to be a constant voltage in such a manner as described.

Also the rectification circuit system for the secondary side DC output voltage Eo2 is formed as a half-wave rectification circuit by connecting the controlled winding NR-rectification diode Do4 of an orthogonal control transformer PRT-3 in series to a line led out from the other end portion of the secondary winding N2 and connecting a smoothing capacitor Co2.

Also the rectification circuit system for the secondary side DC output voltage Eo2 includes an orthogonal control transformer PRT-3 and a control circuit 7 to control the secondary side DC output voltage Eo2 so as to be a constant voltage.

Further, the secondary side DC output voltage Eo3 is obtained from a full-wave rectification circuit formed for the secondary winding N2A. The full-wave rectification circuit is formed from rectification diodes Do5 and Do6 and a smoothing capacitor Co3 while the center tap of the secondary winding N2A is connected to the zero potential.

In the full-wave rectification circuit, the controlled windings NR1 and NR2 of an orthogonal control transformer PRT-4 are inserted in series as seen in FIG. 2, and the control circuit 7 outputs control current of a level corresponding to the secondary side DC output voltage Eo3 to the control winding Nc of the orthogonal control transformer PRT-4. In short, the secondary side DC output voltage Eo3 is controlled to a constant voltage.

Further, the secondary side DC output voltage Eo4 is obtained from a full-wave rectification circuit formed for the secondary winding N2B. The full-wave rectification circuit is formed from rectification diodes Do7 and Do8 and a smoothing capacitor Co5 while the center tap of the secondary winding N2B is connected to the secondary side ground so that a DC voltage E4 is obtained first. Further, a transistor Q5 of a DC switch circuit 6 is inserted in series between the line of the DC voltage E4 and a smoothing capacitor Co6. The secondary side DC output voltage Eo4 is obtained as a voltage across the smoothing capacitor Co6.

Stabilization of the secondary side DC output voltage Eo4 is performed by a switching frequency controlling method. In short, the secondary side DC output voltage Eo4 is branched and inputted as a detection voltage to the control circuit 1. The control circuit 1 outputs a voltage or current, whose level is adjusted in response to the level of the secondary side DC output voltage Eo4, as a control output to the control input terminal Vc of the control IC 2 in the first converter section 101. The control IC 2 adjusts, for example, the frequency of the oscillation signal in response to the control output inputted to the terminal Vc to adjust the frequency of drive signals to be outputted from the drive signal output terminals VGH and VGL. Consequently, the switching frequency of the switching elements Q1 and Q2 is adjustably controlled. As a result, constant voltage control is performed so that the level of the secondary side DC output voltage Eo4 may be fixed.

The DC switch circuit (switch means) 6 is provided to control the starting timing of the secondary side DC output voltage Eo4 in response to a starting signal Vt3 outputted from a microcomputer provided in an apparatus in which the power supply circuit shown in FIG. 2 is provided.

The DC switch circuit 6 is formed by connecting a transistor Q5 of a MOS-FET, a bipolar transistor Q6, a Zener diode DZ and resistors R1, R2, R3 and R4 in such a manner as shown in FIG. 2. In particular, the drain of the transistor Q5 is connected to the positive terminal of the smoothing capacitor Co5, and the source of the transistor Q5 is connected to the positive terminal of the smoothing capacitor Co6. The gate of the transistor Q5 is connected to the collector of the transistor Q6 through the resistor R2. Further, a parallel circuit of the resistor R1//Zener diode DZ is connected between the gate-drain of the transistor Q5. Here, the anode of the Zener diode DZ is connected to the gate side of the transistor Q5 and the cathode of the Zener diode DZ is connected to the drain side of the transistor Q5.

The starting signal Vt3 is inputted as an on/off control signal to the base of the transistor Q6 through the resistor R4. Meanwhile, the resistor R3 is inserted between the base-emitter of the bipolar transistor Q6. The emitter of the bipolar transistor Q6 is connected to the secondary side ground.

As hereinafter described, the starting signal Vt3 is a signal which is changed over between the L level and the H level. Were the starting signal Vt3 has the L level (0 level), the bipolar transistor Q6 keeps an off state. At this time, since the voltage between the gate-source of the transistor Q5 does not satisfy the threshold value, also the transistor Q5 exhibits an off state. Therefore, the positive terminal of the smoothing capacitor Co5 and the positive terminal of the smoothing capacitor Co6 are not connected to each other, and consequently, charging of rectification current into the smoothing capacitor Co6 is not performed. Therefore, even if the DC voltage E4 is obtained between the opposite ends of the smoothing capacitor Co5, the secondary side DC output voltage Eo4 which is a voltage across the smoothing capacitor Co6 remains the 0 level.

In contrast, if the starting signal Vt3 rises to the H level until a predetermined positive level is obtained, then the transistor Q6 is changed over to an on state and a potential difference appears between the opposite ends of the resistor R2. As a result, the anode of the Zener diode DZ is connected to the secondary side ground through the collector-emitter of the transistor Q6, and consequently, the Zener diode DZ is rendered conducting by the DC voltage E4. Since the Zener diode DZ conducts, a gate voltage of a level which satisfies the threshold value is applied to the gate of the transistor Q5, and also the transistor Q5 is turned on. As a result, the positive terminal of the smoothing capacitor Co5 and the positive terminal of the smoothing capacitor Co6 are connected to each other, and consequently, rectification current is charged into and discharged from the smoothing capacitor Co6. Accordingly, the secondary side DC output voltage Eo4 is generated.

The second converter section 102 includes switching elements Q3 and Q4 connected in a half bridge connection, clamp diodes DD3 and DD4, a partial resonance capacitor Cp, a control IC 2, an insulating converter transformer PIT-2 (primary winding N1 and secondary winding N2), a primary side DC resonance capacitor C1, and a loose coupling transformer VFT-2, all connected in a similar manner as in the first converter section 101. Consequently, the primary side switching converter forms a composite resonance type converter including a current resonance type converter of the separately excited half bridge connection type and a partial voltage resonance circuit.

Further, on the secondary side of the second converter section 102, a center tap provided for the secondary winding N2 of the insulating converter transformer PIT-2 is grounded to the secondary side ground, and rectification diodes Do9 and Do10, a noise removing resistor R5 and smoothing capacitors Co7 and Co8 are connected in such a manner as seen in FIG. 2 to form a full-wave rectification circuit. Thus, the secondary side DC output voltage Eo5 is obtained as a voltage across the smoothing capacitor Co8 by rectification operation of the full-wave rectification circuit.

The fixed voltage control of the secondary side DC output voltage Eo5 is performed by a switching frequency control method of controlling the switching frequency of the primary side switching converter as can be recognized from the fact that the second converter section 102 includes the control circuit 1.

Now, a configuration for the power factor improvement of the power supply circuit shown in FIG. 2 which is configured in such a manner as described hereinabove is described.

The circuit shown in FIG. 2 includes the power factor improving circuit 3 for improving the power factor. The power factor improving circuit 3 is configured such that the voltage of a switching output of a primary side converter is fed back to a rectification circuit system which rectifies and smoothes the commercial AC power supply AC. In this instance, the circuit shown in FIG. 2 includes the loose coupling transformers VFT-1 and VFT-2 as means for feeding back the voltage of the switching output.

Figure 4:
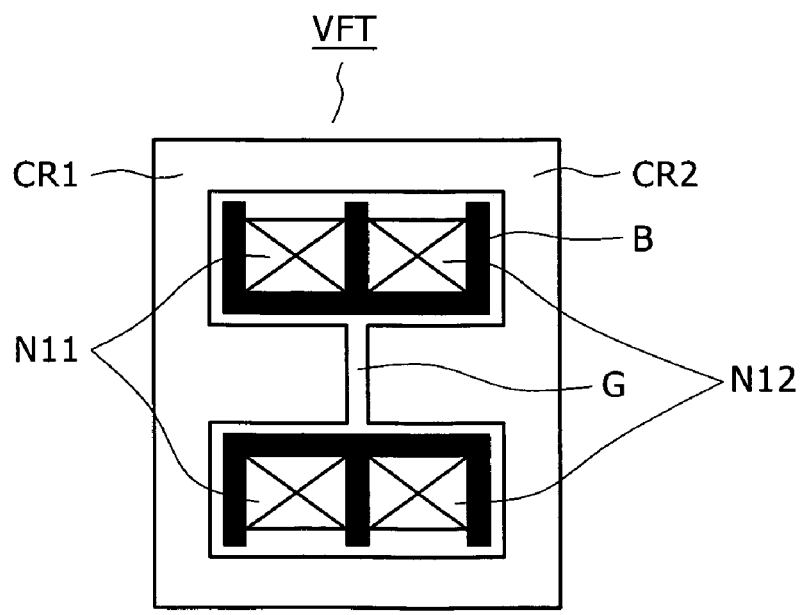
FIG. 4 is a sectional view showing an example of a structure of a loose coupling transformer.

An example of a structure of the loose coupling transformers VFT-1 and VFT-2 is shown in FIG. 4.

As shown in FIG. 4, the loose coupling transformer VFT includes an EE type core including E type cores CR1 and CR2 made of a ferrite material and combined such that the magnetic legs thereof are opposed to each other.

The loose coupling transformer VFT further includes a bobbin B made of, for example, a resin material and formed divisionally such that a primary side winding portion and a secondary side winding portion are independent of each other. The primary winding N11 is wound on one of the winding portions of the bobbin B while the secondary winding N12 is wound on the other winding portion. As the bobbin B on which the primary winding and the secondary winding are wound in this manner is attached to the EE type core (CR1, CR2), the primary side winding and the secondary side winding are wound in different winding regions from each other on the central magnetic leg of the EE type core. The structure of the entire loose coupling transformer VFT is obtained in this manner.

In this instance, a gap G having a required gap length is formed in the joining portion of the central magnetic leg. By the gap G, the coupling coefficient is set so that a loose coupling state of, for example, k=0.75 or less is obtained.

Power factor improving operation of the power factor improving circuit 3 is such as follows.

First, in order to make it possible to have the description understood easily, power factor improving operation only by the first converter section 101 side is described.

In the loose coupling transformer VFT-1 provided in the first converter section 101, a switching output of the primary side switching converter of the first converter section 101 is transmitted to the primary winding N11. In response to this, an alternating voltage is excited in the secondary winding N12 of the loose coupling transformer VFT-1.

Here, the secondary winding N12 of the loose coupling transformer VFT-1 is interposed between the choke coil LN and the positive input terminal of the bridge rectification circuit Di in the positive line of the commercial AC power supply AC. In short, the secondary winding N12 of the loose coupling transformer VFT-1 is inserted in the rectification current path. According to the loose coupling transformer VFT-1, operation of feeding back the voltage of the switching output of the primary side switching converter to the rectification current path is obtained.

Since the voltage of the switching output is fed back to the rectification current path in such a manner as described above, when rectification current flows to rectification diodes (Da to Dd) of the high speed recovery type which form the bridge rectification circuit Di, the rectification diodes are driven to perform switching operation by the alternating voltage excited in the secondary winding N12 of the loose coupling transformer VFT-1. Consequently, the rectification current flowing through the rectification diodes is switched on and off, and consequently, the rectification current has an alternating waveform. In short, high frequency components are superposed on the rectification current flowing from AC input current IAC as a source.

The high frequency components of the rectification current described above first flow in the following manner where the commercial AC power supply AC is of the 200 V type and a full-wave rectification circuit is formed.

Within a period in which the AC input voltage VAC is in the positive, the high frequency components flow along the rectification current path of the secondary winding N12→rectification diode Da of the bridge rectification circuit Di→smoothing capacitors [Ci1//Ci1]→[Ci2//Ci2]→primary side ground→rectification diode Dd→and negative line of the commercial AC power supply AC through the positive line of the commercial AC power supply AC from the filter capacitor CN.

Further, within a period in which the AC input voltage VAC is in the negative, the high frequency components flow along the rectification current path of the rectification diode Dc→smoothing capacitors [Ci1//Ci1]-[Ci2//Ci2]→primary side ground→rectification diode Db→secondary winding N12 through the negative line of the commercial AC power supply AC from the filter capacitor CN.

On the other hand, the high frequency components flow in the following manner where the commercial AC power supply AC is of the 100 V type and a voltage doubler rectification circuit is formed.

Within a period in which the AC input voltage VAC is in the positive, the high frequency components flow along the rectification current path of the secondary winding N12→rectification diode Da of the bridge rectification circuit Di→smoothing capacitors [Ci1//Ci1]→and negative line of the commercial AC power supply AC through the positive line of the commercial AC power supply AC from the filter capacitor CN.

Further, within a period in which the AC input voltage VAC is in the negative, the high frequency components flow along the rectification current path of the smoothing capacitors [Ci2//Ci2]→primary side ground→rectification diode Db→secondary winding N12→positive line of the commercial AC power supply AC through the negative line of the commercial AC power supply AC from the filter capacitor CN.

As can be recognized from the rectification current paths described above, rectification current flows through one of the rectification diodes (Da to Dd) of the high speed recovery type within both of the periods within which the AC input voltage is in the positive/negative. In short, it can be recognized that the rectification current is switched on and off such that it is switched by the rectification diodes of the high speed recovery type. Then, since the rectification current is switched on and off in this manner, charging current into the smoothing capacitor C1 flows also within a period in which the rectification output voltage level is lower than the level of the rectification smoothed voltage Ei.

As a result, since an average waveform of the AC input current approaches the waveform of the AC input voltage, the conduction angle of the AC input current IAC is expanded. Since the conduction angle of the AC input current IAC is expanded in this manner, improvement of the power factor is achieved.

Then, the power factor improving circuit 3 shown in FIG. 2 actually includes also the loose coupling transformer VFT-2 of the second converter section 102.

Here, the secondary winding N12 of the loose coupling transformer VFT-2 is connected in parallel to the secondary winding N12 of the loose coupling transformer VFT-1 of the first converter section 101. Accordingly, in the rectification current paths described above, rectification current actually flows through the parallel circuit of the secondary windings N12//N12 of the loose coupling transformers VFT-1 and VFT-2. Consequently, the parallel circuit of the secondary windings N12//N12 is included in the rectification current path.

This signifies that the power factor improving circuit 3 is configured such that the voltages of the switching outputs of both of the first converter section 101 and the second converter section. 102 are fed back to the rectification current path by the loose coupling transformers VFT-1 and VFT-2.

In short, the present embodiment has such a configuration that a voltage is fed back to the first converter section 101 by means of the loose coupling transformer VFT-1 while a voltage is fed back to the second converter section 102 by means of the loose coupling transformer VFT-2 to achieve power factor improvement. It is to be noted that the inductance values of the primary winding N11 and the secondary winding N12 of each of the loose coupling transformers VFT-1 and VFT-2 are selected so that, for example, the power factor PF=approximately 0.8 is obtained.

Further, according to the configuration of the power supply circuit shown in FIG. 2, the first converter section 101 produces five secondary side DC output voltages of the secondary side DC output voltages Eo and Eo1 to Eo4, and the second converter section 102 produces the secondary side DC output voltage Eo5.

In particular, also in the present embodiment,

Eo: logic power supply, 5 V/6 A to 2 A
Eo1: analog IC driving power supply, 12 V/0.4 A
Eo2: digital IC driving power supply, 3.3 V/1.5 A
Eo3: sound outputting power supply, 26 V/1.3 A to 0.1 A
Eo4: data power supply, 70 V/2.5 A to 0.35 A
Eo5: maintaining power supply, 200 V/1.75 A to 0.1 A are obtained similarly as in the case of the related art described hereinabove with reference to FIG. 11.

However, in the present embodiment, the six loads (secondary side DC output voltages) are supplied from two converter sections of the first converter section 101 and the second converter section 102. Accordingly, the maximum load powers for which the converter sections should be ready are first converter section 101: 250 W
second converter section 102: 350 W and consequently, totaling 600 W is required.

Then, under the configuration wherein the secondary side DC output voltages Eo and Eo1 to Eo5 are produced and supplied to loads in such a manner as described above, it is necessary for the secondary side DC output voltages to rise in a predetermined order when the power supply is activated as described hereinabove. In particular, it is required to start the secondary side DC output voltage Eo which is a logic power supply and then start the secondary side DC output voltage Eo5 which is a maintaining power supply and the secondary side DC output voltage Eo4 which is a data power supply successively.

In the power supply circuit shown in FIG. 2, such successive starting of the secondary side DC output voltages as described above is performed in the following manner.

First, for the successive starting control of the secondary side DC output voltages, the starting signals Vt1, Vt2 and Vt3 which originally are signals (activation control signals) for controlling activation of the control ICs can be outputted from the microcomputer not shown in FIG. 2.

It is to be noted that the microcomputer here is provided in an apparatus in which the power supply circuit shown in FIG. 2 is incorporated. Further, the power supply circuit shown in FIG. 2 is a main power supply, and when the main power supply is off, the microcomputer is operating with a standby power supply not shown in FIG. 2. Accordingly, even if the main power supply is not operative, since the microcomputer is operating with the standby power supply, it is possible to output the starting signals Vt1, Vt2 and Vt3.

It is to be noted that, also with regard to the plasma display apparatus 10 shown in FIG. 1, only a configuration based on a relationship with the switching power supply circuit 11 which is the main power supply, the plasma display panel section 12 and the television reception function section 13 is shown, and the microcomputer and the standby power supply are omitted.

The starting signal Vt1 is inputted to the starting terminal Vt of the control IC 2 of the first converter section 101. The starting signal Vt2 is inputted to the starting terminal Vt of the second converter section 102. The starting signal Vt3 is inputted as an on/off control signal for controlling the transistor Q6 of the DC switch circuit which is provided in the rectification circuit of the secondary side DC output voltage Eo4 on the secondary side of the first converter section 101 as described hereinabove.

Figure 5:
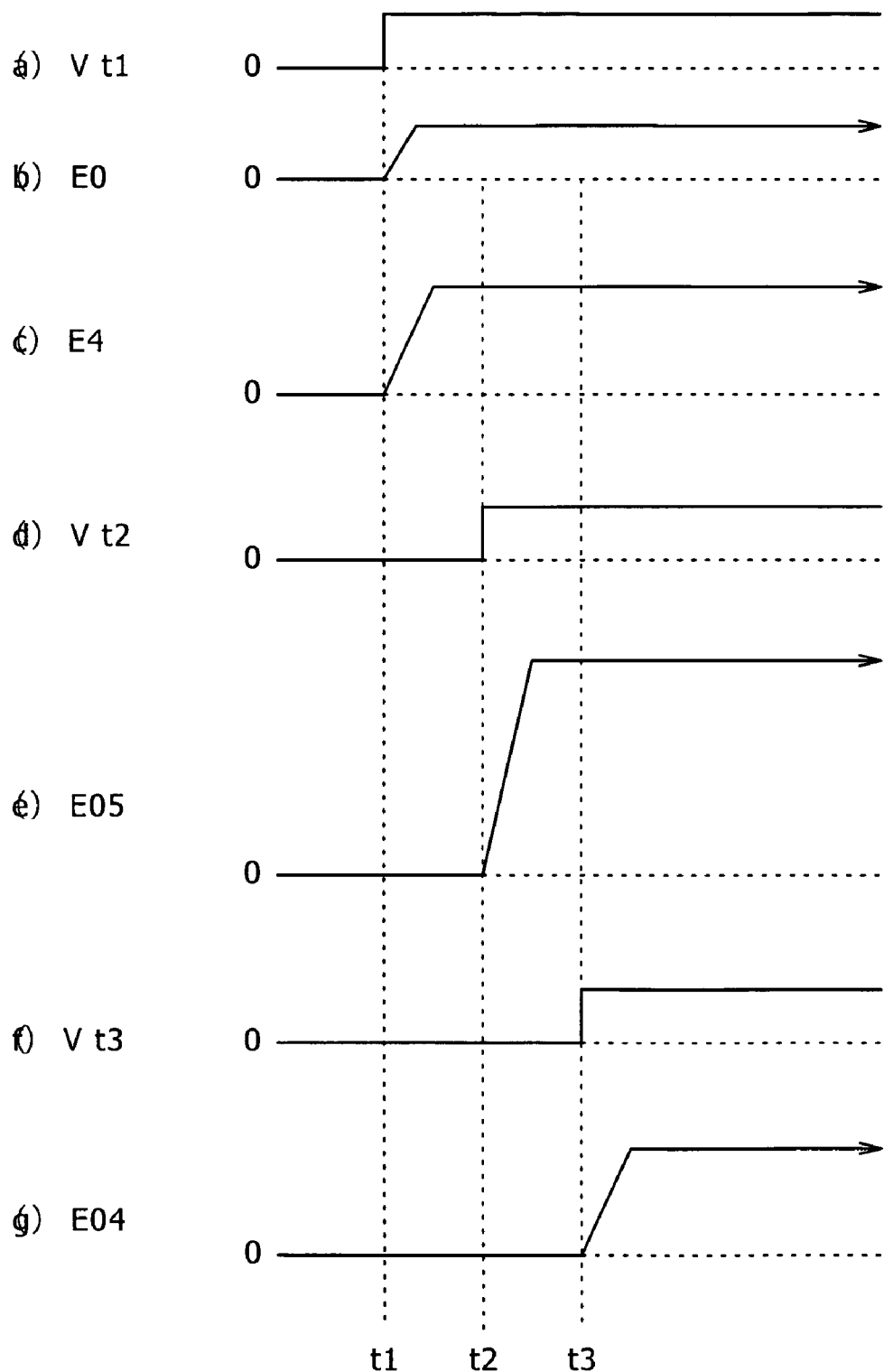
FIGS. 5(a) to 5(g) are timing charts illustrating starting control of a secondary side DC output voltage in the first embodiment.

Here, the starting signals Vt1, Vt2 and Vt3 are successively changed over from the L level to the H level at timings of times t1, t2 and t3 as illustrated in (a), (d) and (f) of FIG. 5, respectively. Further, prior to time t1 at which all of the starting signals Vt1, Vt2 and Vt3 have the L level, the first converter section 101 and the second converter section 102 are in a state wherein they are not activated.

For example, if the main power supply is turned on and the microcomputer recognizes that the rectification smoothed voltage Ei rises to a prescribed level, then the microcomputer changes over the starting signal Vt1 from the L level to the H level at a predetermined timing given as time t1 and outputs the starting signal Vt1 of the H level as illustrated in (a) of FIG. 5.

Consequently, at time t1, the control IC 2 of the first converter section 101 is activated. In other words, the first converter section 101 starts activation. In response to the activation, the secondary side DC output voltages to be obtained on the secondary side of the first converter section 101 rise. In short, although the secondary side DC output voltage Eo has the 0 level prior to time t1 as seen in (b) of FIG. 5, after time t1, the secondary side DC output voltage Eo rises in such a manner that it increases as the charged amount of the smoothing capacitor Co increases. Then, after a prescribed level is reached, the state wherein the secondary side DC output voltage Eo is controlled fixedly to the prescribed level is maintained.

It is to be noted, however, that the secondary side DC output voltage Eo4 does not rise similarly as seen in (g) of FIG. 5 although the DC voltage E4 illustrated in (c) of FIG. 5 rises at time t1. This is because, at the timing of time t1, the transistor Q5 in the DC switch circuit 6 which is controlled on/off is in an off state. As described hereinabove, the DC switch circuit 6 operates such that, when the starting signal Vt3 which is an on/off control signal has the L level, the transistor Q5 is controlled to an off state. When the transistor Q5 is in an off state, rectification current is not charged into the smoothing capacitor Co6, and the secondary side DC output voltage Eo4 is not produced.

Then, the starting signal Vt2 illustrated in (d) of FIG. 5 is changed over to the H level at time t2 after time t1 at which the starting signal Vt1 changes to the H level and is outputted as a signal of the H level. It is to be noted that the timing of time t2 is set so as to be later than a point of time at which starting of operation of circuit sections which use the secondary side DC output voltage Eo as a power supply therefor is assured, for example, because the secondary side DC output voltage Eo rises completely up to the prescribed level in response to the starting signal Vt1 which is changed over to the H level, for example, at time t1.

Then, in response to the changeover of the starting signal Vt2 to the H level, the control IC 2 of the second converter section 102 is activated. Consequently, the secondary side DC output voltage Eo5 rises in such a manner as seen in (e) of FIG. 5 from time t2.

Then, at a timing of time t3 at which a state wherein the secondary side DC output voltage Eo5 has risen completely to the prescribed level and is in a fixed voltage state is obtained, the last starting signal Vt3 is changed over to the H level as illustrated in (f) of FIG. 5.

In this instance, in response to the changeover of the starting signal Vt3 into the H level, the transistor Q5 of the DC switch circuit 6 is changed over into an on state. In response to the changeover, the DC voltage E4 is charged into the smoothing capacitor Co6 through the drain-source of the transistor Q5, and thereupon, the secondary side DC output voltage Eo4 rises as seen in (g) of FIG. 5.

Figure 11:
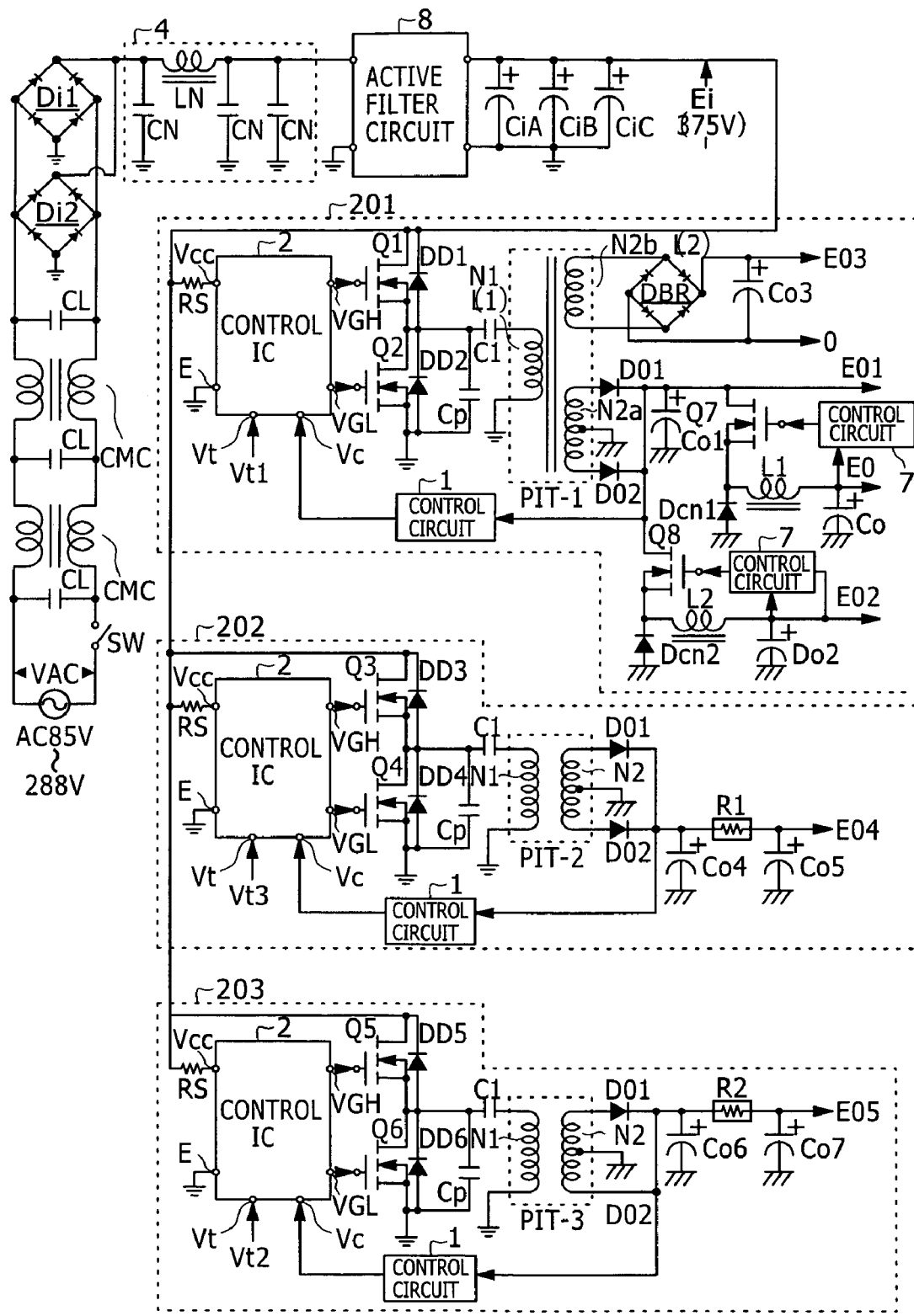
FIG. 11 is a circuit diagram showing an example of a configuration of a power supply circuit in which the active filter is incorporated as a related art.

In this manner, the present embodiment controls the rising order of the secondary side DC output voltage upon activation of the power supply so that it may be appropriate rising order same as that in the case of FIG. 11.

It is to be noted that, for reference, the shape and the size of the core of the transformers provided in the power supply circuit shown in FIG. 2 are given below.

PIT-1: EER-40
PIT-2: EER-42
VFT-1, VFT-2: EE-28
PRT: ferrite core (15 mm×15 mm×20 mm)

Further, a result of an experiment conducted with regard to the power supply circuit shown in FIG. 2 is described.

In the conditions of the load power Po=600 W and the AC input voltage VAC=100 V, the synthesized power conversion efficiency ηAC→DC=92.5%, and this exhibits an improvement by 3.2% from the characteristic of the power supply circuit of the related art shown in FIG. 11.

Further, in the conditions of the load power Po=600 W and the AC input voltage VAC=230 V, the synthesized power conversion efficiency ηAC→DC=94.0%, and a result that it exhibits an improvement by 2.3% from the characteristic of the power supply circuit shown in FIG. 11 was obtained.

Meanwhile, as a power factor characteristic, in the conditions of the load power Po=600 W and the AC input voltage VAC=100 V, the power factor PF=0.83 was obtained. Then, when the AC input voltage VAC=100 V, PF>0.75 was obtained within the range of the load power Po=600 W to 25 W.

Further, in the conditions of the load power Po=600 W and the AC input voltage VAC=230 V, the power factor PF=0.78 was obtained. Further, when the AC input voltage VAC=230 V, a power factor higher than a prescribed a value was obtained within the range of the load power Po=600 W to 300 W, and the harmonic distortion regulation value of the IEC (International Electrotechnical Commission) was satisfied successfully.

Where the power supply circuit of the present embodiment shown in FIG. 2 and configured in such a manner as described above and the circuit of FIG. 1 shown as a related art are compared with each other, the followings can be said.

First, in the circuit shown in FIG. 2, since it is configured such that it includes the power factor improving circuit 3 according to a voltage feedback type, the active filter is omitted. The active filter constructs a converter, and as can be recognized from the description given with reference to FIG. 11, it actually is formed from a great number of parts including a plurality of switching elements and an IC for driving the switching elements.

In contrast, the power factor improving circuit 3 provided in the power supply circuit shown in FIG. 2 only adds the loose coupling transformers VFT-1 and VFT-2 to the rectification current path, and the loose coupling transformers VFT-1 and VFT-2 are part elements including a small size core of the EE-28 type as described hereinabove. Accordingly, the power factor improving circuit 3 includes a considerably smaller number of parts when compared with the active filter, and also the board mounting area of the part elements decreases.

Consequently, the power supply circuit shown in FIG. 2 can be produced at a much reduced cost as a power supply circuit ready for a wide range including a power factor improving function when compared with that of the circuit shown in FIG. 11. Also reduction in size and weight of the circuit board can be achieved effectively.

Further, it can be recognized that, in the power supply circuit shown in FIG. 2, the active filter and the step-down type converter are omitted, and a converter which performs hard switching operation is eliminated. Here, since the present embodiment is configured such that it includes the orthogonal control transformers PRT and the control circuit 7 such that stabilization of the secondary side DC output voltages Eo, Eo1, Eo2 and so forth is achieved by supply of control current such as DC current, it is possible to omit the step-down type converter.

Then, since only soft switching operation is involved as operation of the first converter section 101, the second converter section 102 and the power factor improving circuit 3 which form the power supply circuit of FIG. 2, the level of switching noise is reduced significantly when compared with that of the active filter shown in FIG. 11.

Further, while the number of composite resonance type converter sections in the power supply circuit shown in FIG. 11 is 3, the number of composite resonance type converter sections in the power supply circuit shown in FIG. 2 is reduced to two including the first and second converter sections 101 and 102. Also where the number of composite resonance type converter sections is reduced in this manner, reduction in size and weight of the circuit described above is promoted. Further, since the switching operation is soft switching operation, although the switching noise is originally small in amount, if the number of composite resonance type converters decreases, also the switching noise decreases as much. Also a merit in this regard is achieved.

Therefore, in the circuit shown in FIG. 2, it can sufficiently clear the power supply disturbance specification value if it includes one stage of a line filter formed from one common mode choke coil CMC and two across capacitors CL.

Also by reduction of the number of part elements of the noise filter in this manner, reduction of the cost of the power supply circuit and reduction in size and weight of the circuit board are promoted.

Further, the total power conversion efficiency of the power supply circuit shown in FIG. 11 is determined by the AC-DC power conversion efficiency (ηAC/DC) of the active filter at the preceding stage and the DC-DC power conversion efficiency (ηDC/DC) of the current resonance type converters at the following stage. In contrast, since the power supply circuit shown in FIG. 2 does not include the active filter at the preceding stage, the synthesized power conversion efficiency may be regarded as the total value of the AC-DC power conversion efficiency (ηAC→DC) of the current resonance type converter. Further, it is known that, where a power factor improving circuit by the voltage feedback type is provided as in the present embodiment, the power conversion efficiency of the same is substantially equal to that of a composite resonance type converter which does not include a power factor improving circuit.

Consequently, the power supply circuit shown in FIG. 2 is improved significantly in terms of the power conversion efficiency when compared with the power supply circuit shown in FIG. 11 as described hereinabove.

Further, the power supply circuit shown in FIG. 11 is configured such that the active filter circuit 8, three converter sections 201, 202 and 203 and two step-down type converters operate with switching frequencies different from one another.

In contrast, in the present embodiment, only the two first and second converter sections 101 and 102 perform switching operation independently each other with switching frequencies different from each other. The switching frequencies of the first and second converter sections 101 and 102 are varied in response to the levels of the secondary side DC output voltages E4 and Eo5 within the range of, for example, 70 KHz to 150 KHz to achieve the voltage fixation.

In this manner, where the number of converters which operate for switching with different switching frequencies from each other is reduced, since also the interference between the ground potentials of the primary side and the secondary side decreases as much, also the operation of the power supply circuit is further stabilized.

Figure 12:
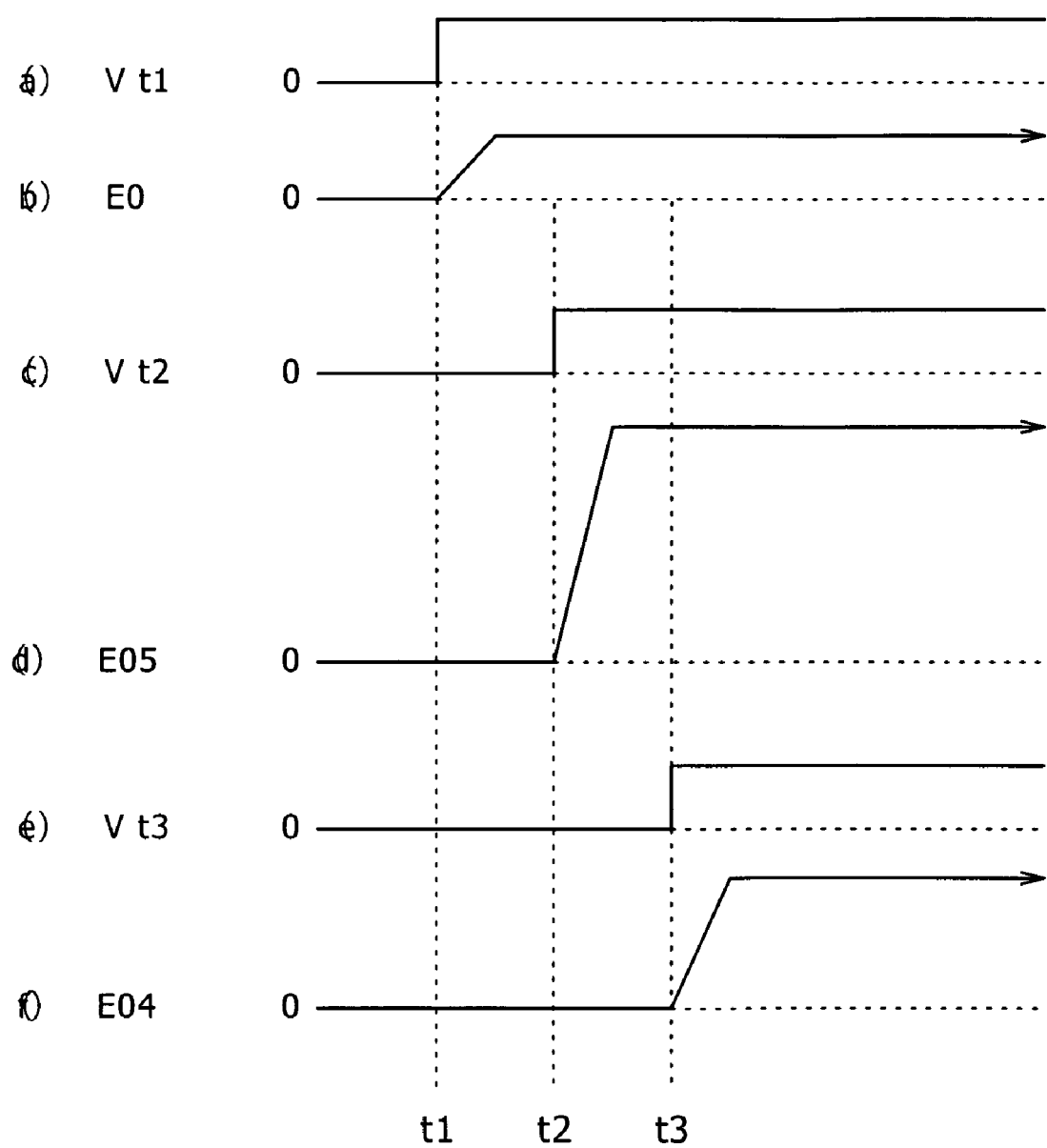
FIGS. 12(a) to 12(f) are timing charts illustrating starting control of a secondary side DC output voltage in the power supply circuit shown in FIG. 11.

Incidentally, the reason why the three converter sections 201, 202 and 203 are provided as composite resonance type converters in the circuit shown in FIG. 11 is that, as described hereinabove with reference to FIG. 12, in this instance, the rising timings of the secondary side DC output voltages must be controlled at the three stages of times t1, t2 and t3.

In particular, if it is tried to start the secondary side DC output voltages corresponding to the starting signals Vt1, Vt2 and Vt3 which are outputted at times t1, t2 and t3, then a construction that it includes three composite resonance type converters and activation of the control IC 2 for each of the composite resonance type converters is controlled with the starting signals Vt1, Vt2 and Vt3 has been adopted heretofore.

In contrast, in the circuit shown in FIG. 2, the DC switch circuit 6 is provided such that the on/off state of the DC switch circuit 6 is controlled with the starting signal Vt3 to control rising of the secondary side DC output voltage Eo4. Consequently, the number of control ICs necessary to control the rising of the secondary side DC output voltages is reduced by one. In other words, it is possible to reduce one converter section.

Where a converter section is reduced, also reduction of the number of parts as much can be anticipated. Further, also the switching loss by the switching elements which form the primary side switching converter is decreased as much.

Figure 6:
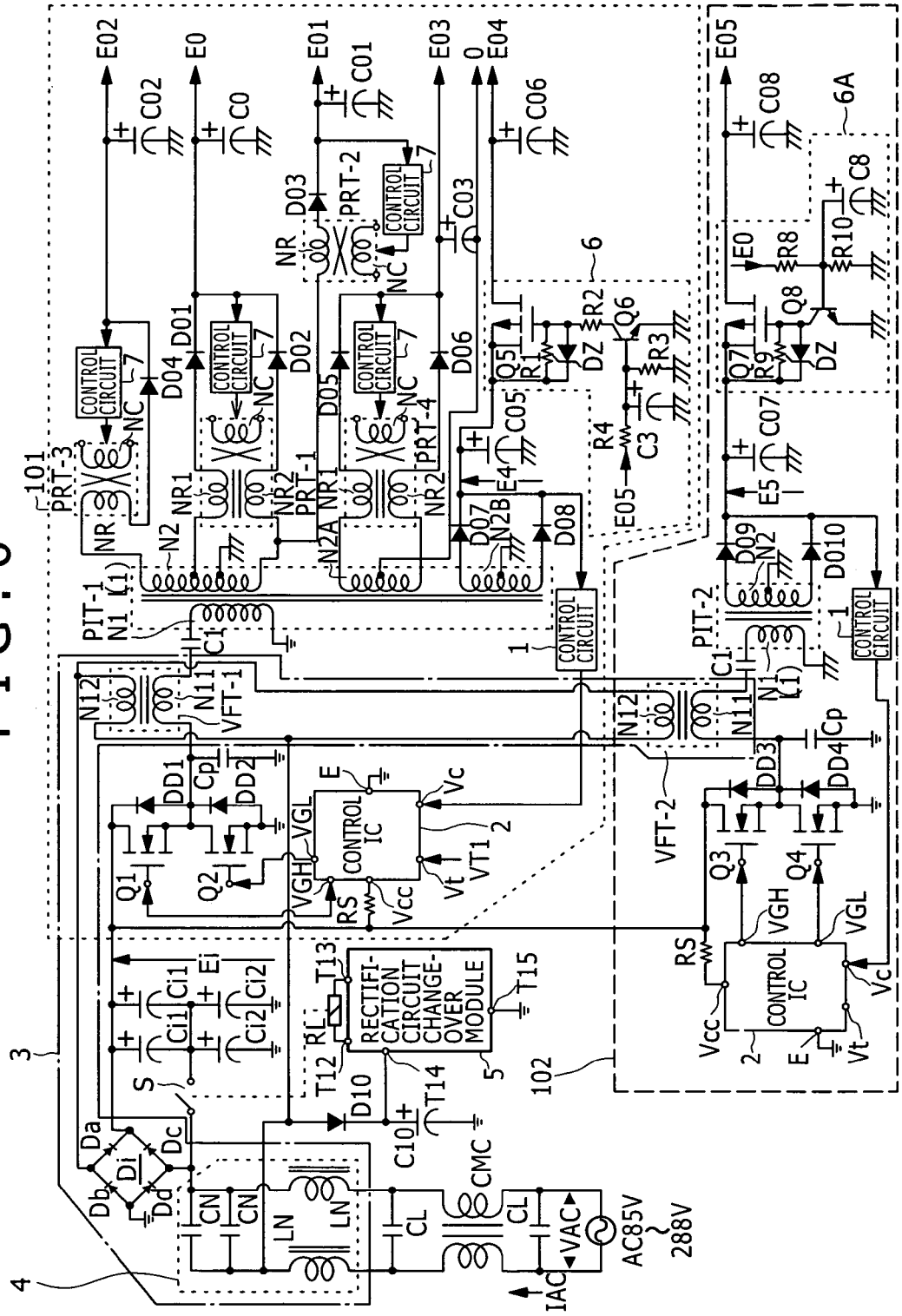
FIG. 6 is a circuit diagram showing an example of a configuration of a switching power supply circuit as a second embodiment of the present invention.

FIG. 6 shows an example of a configuration of a switching power supply circuit as a second embodiment. It is to be noted that, in FIG. 6, like elements to those of FIG. 2 are denoted by like reference characters and description thereof is omitted herein.

In the power supply circuit shown in FIG. 6, firstly the internal configuration of the DC switch circuit (switch section) 6 provided on the first converter section 101 side is different from that in the case of FIG. 2. In particular, the DC switch circuit 6 includes a time constant capacitor C3. The power factor improving circuit 3 in this instance is formed from, for example, an electrolytic capacitor, and is connected at the positive terminal thereof to the base of the bipolar transistor Q6 and at the negative terminal thereof to the secondary side ground.

Further, in this instance, as an on/off control signal to be inputted to the DC switch circuit 6, the secondary side DC output voltage Eo5 of the second converter section 102 is inputted in place of the starting signal Vt3.

In such a configuration as described above, a predetermined delay time according to the time constant of a resistor R4 and a time constant capacitor C4 is given to a point of time at which the transistor Q6 is placed fully into an on state after a point of time at which inputting of an on/off control signal of a predetermined level, for example, of the positive polarity is started. Consequently, a delay according to the time constant of the resistor R4 and the time constant capacitor C4 is given also to a period of time until the transistor Q5 is placed fully into an on state after the inputting of the on/off control signal is started.

Further, in the circuit shown in FIG. 6, also on the secondary side of the second converter section 102, a DC switch circuit 6A is provided in place of the noise removing resistor R5 shown in FIG. 2. Also the DC switch circuit 6A (switch section) is formed from a transistor Q7, a bipolar transistor Q8, a Zener diode DZ, resisters R8, R9, R10 and a time constant capacitor C8 connected in a substantially similar manner as in the case of the DC switch circuit 6. Accordingly, also by the DC switch circuit 6A, a delay according to a time constant of the resistor R8 and the time constant capacitor C8 is given to a period of time until the transistor Q7 is placed fully into an on state after inputting of the on/off signal is started. Then, the secondary side DC output voltage Eo produced by the first converter section 101 side is inputted as the on/off control signal to the DC switch circuit 6A.

Further, in the present power supply circuit, only the starting signal Vt1 is outputted from the microcomputer and inputted to the starting terminal Vt of the control IC 2 of the first converter section 101.

Control operation for successively starting the secondary side DC output voltages in the circuit shown in FIG. 6 is described with reference to a timing chart of FIG. 7.

Figure 7:
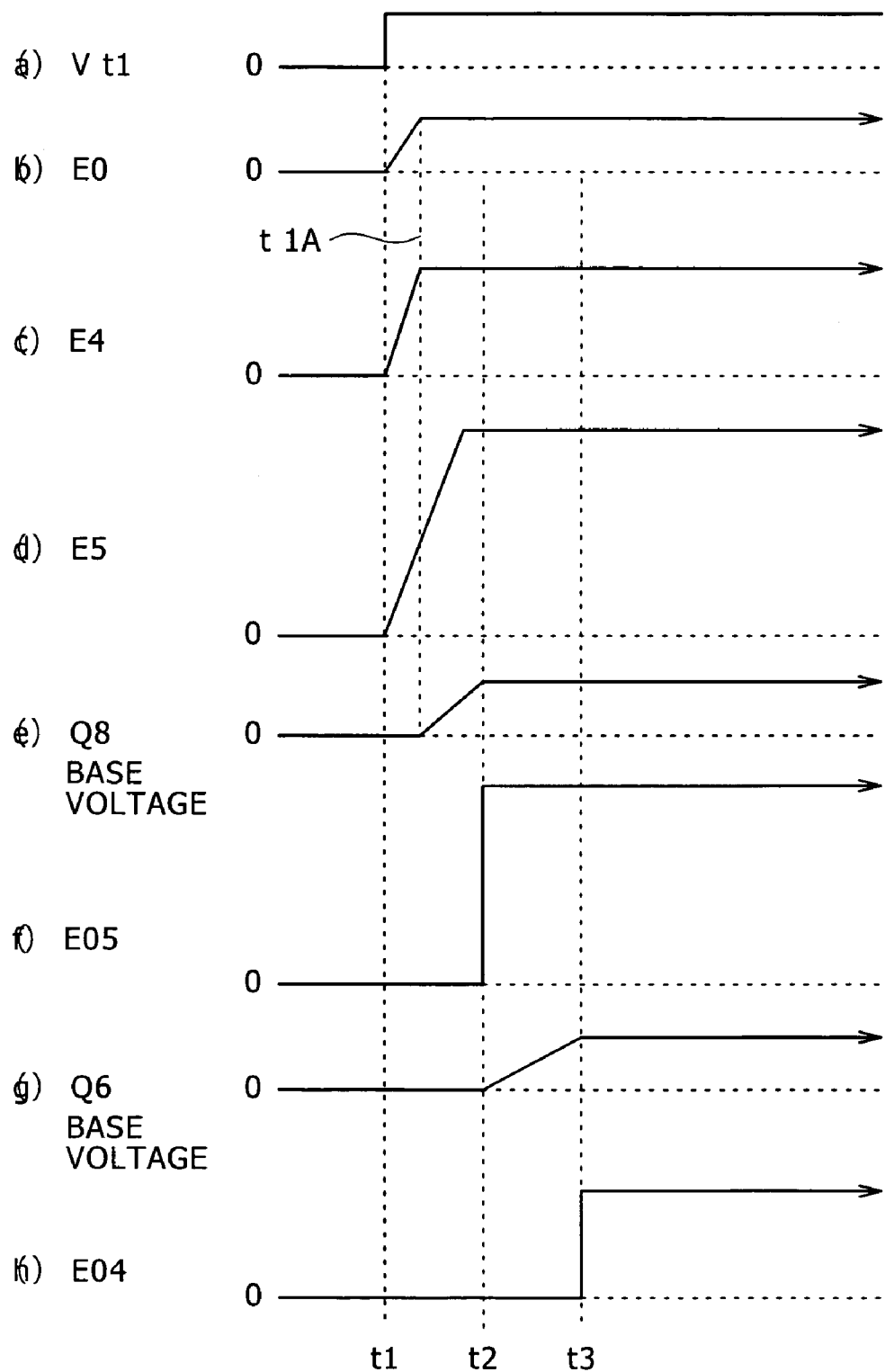
FIGS. 7(a) to 7(h) are timing charts illustrating starting control of a secondary side DC output voltage in the second embodiment.
Figure 8:
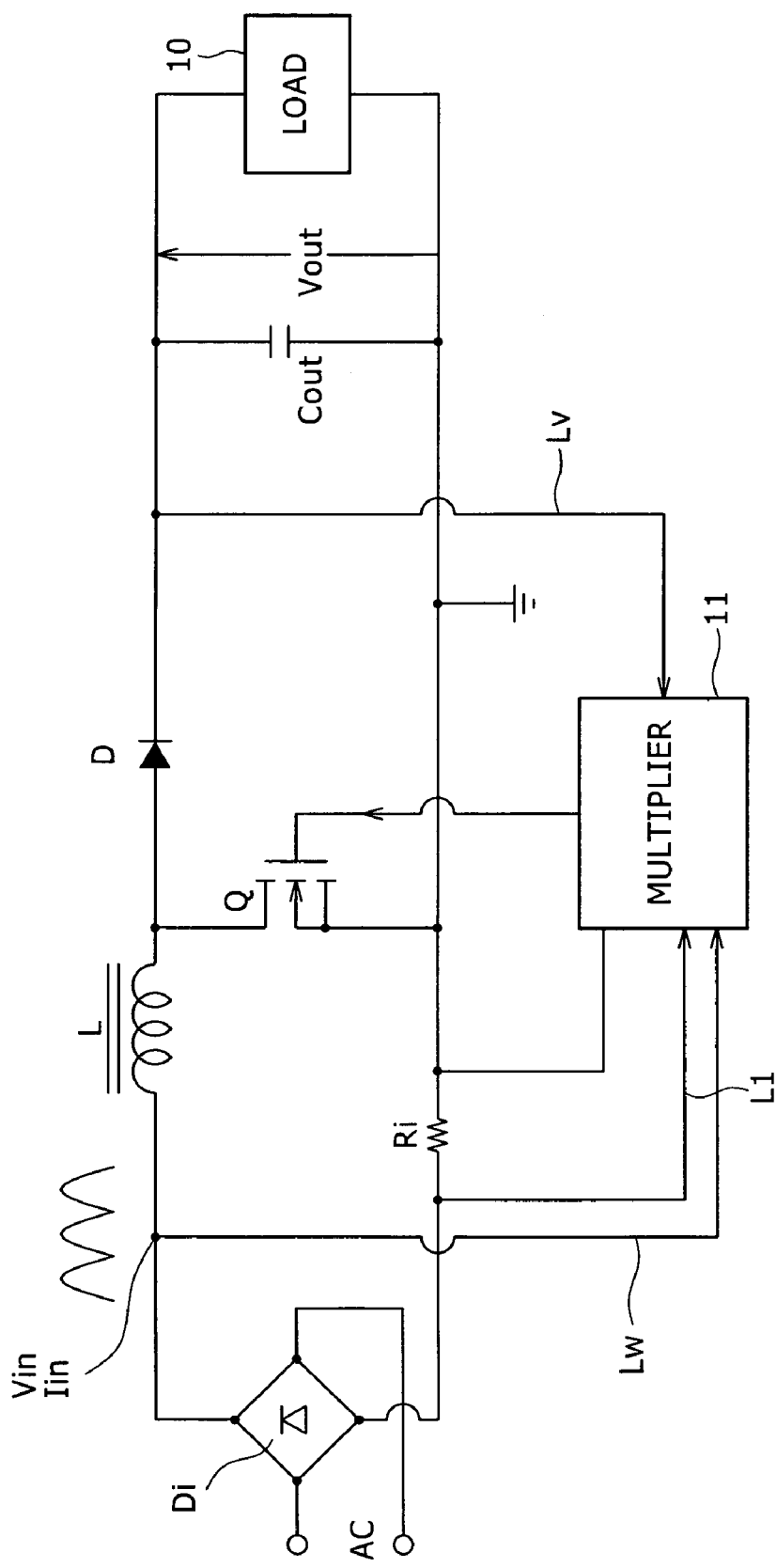
FIG. 8 is a circuit diagram showing a basic circuit configuration of an active filter as a related art.
Figure 9:
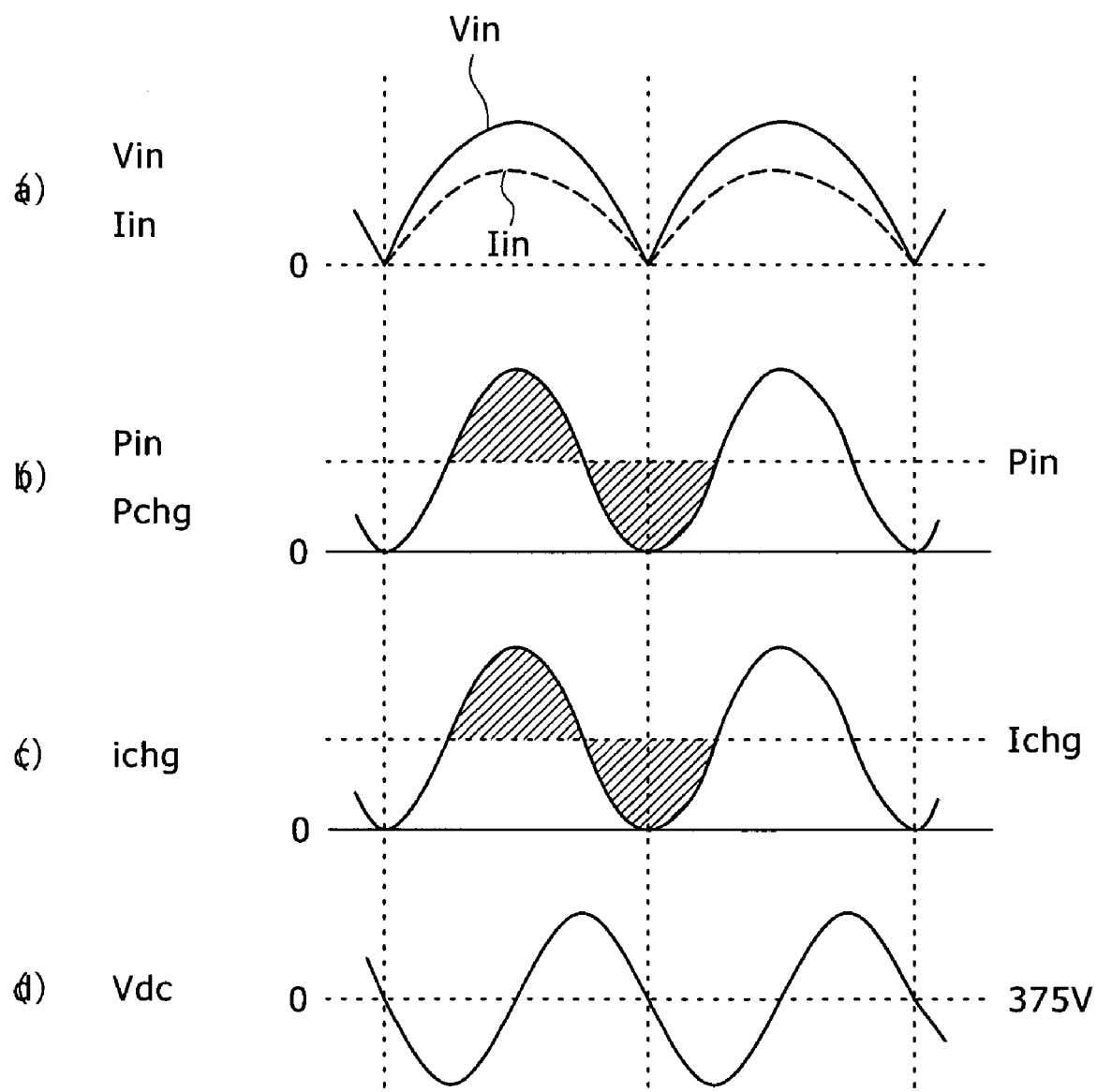
FIGS. 9(a) to 9(d) are waveform diagrams illustrating operation of the active filter shown in FIG. 11.
Figure 10:
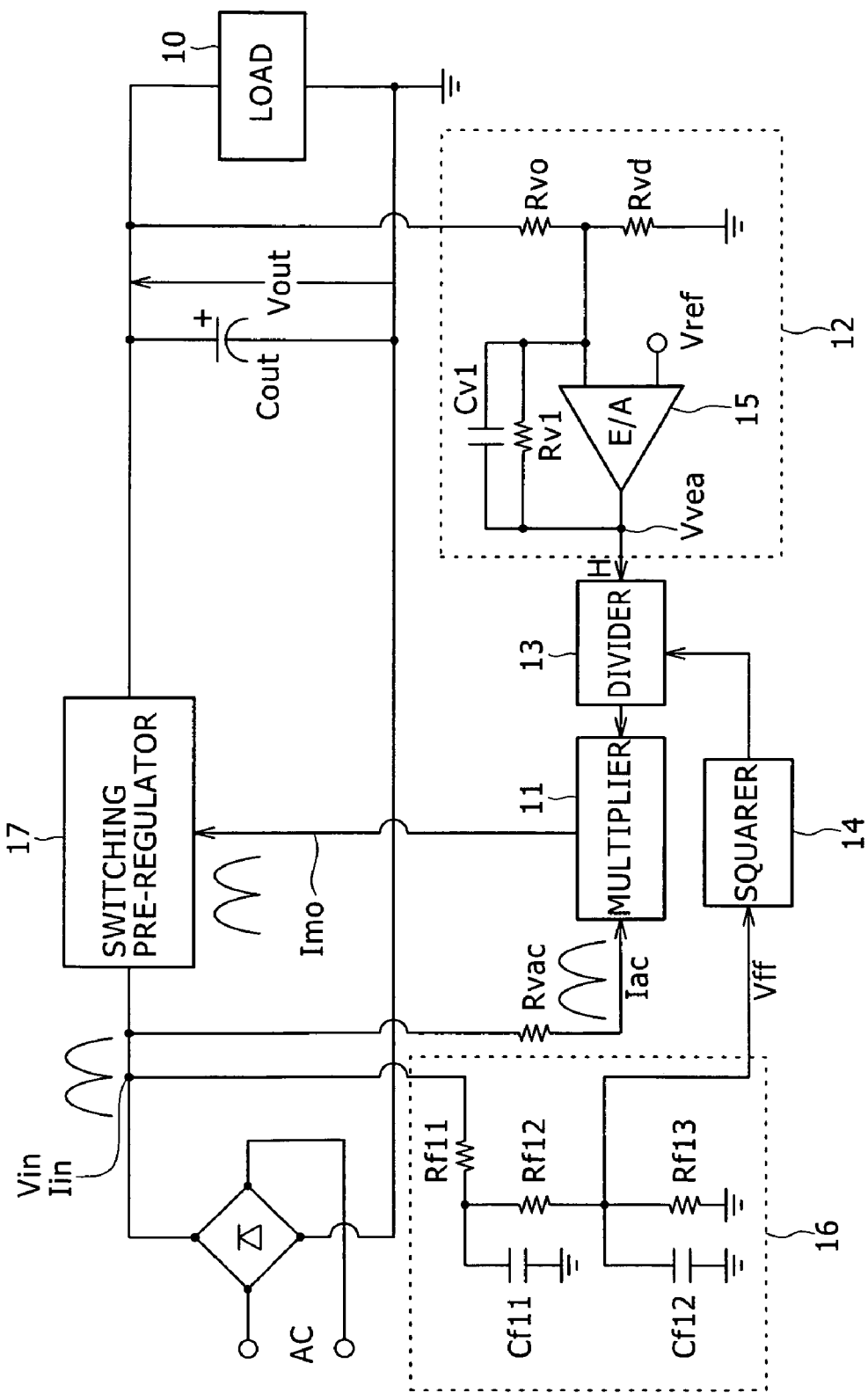
FIG. 10 is a circuit diagram showing a configuration of a control circuit system of the active filter.

Also in this instance, when the microcomputer recognizes that the main power supply is turned on, it changes over the starting signal Vt1 from the L level to the H level at a predetermined timing given as time t1 as seen in (a) of FIG. 7 and outputs the starting signal Vt1 of the H level. In response to the starting signal Vt1, also the first converter section 101 is activated at time t1 and the secondary side DC output voltage Eo rises as illustrated in (b) of FIG. 7.

Further, corresponding to time t1, also the secondary side DC output voltage obtained on the secondary side of the first converter section 101 rises. However, also in this instance, the secondary side DC output voltage Eo4 does not rise at time t1 as seen from (h) of FIG. 7. The DC output voltage E4 at the preceding stage rises at time t1 in response to the activation of the first converter section 101 as seen in (c) of FIG. 7.

The time t1 at which the starting signal Vt1 changes over to the H level corresponds substantially to the point of time at which the main power supply is turned on. The activation terminal of the second converter section 102 shown in FIG. 6 is open without having a starting signal inputted thereto. In this instance, the control IC 2 starts operation and is activated in response to the voltage upon activation inputted from the power supply input terminal Vcc.

Therefore, also the second converter section 102 is activated such that it starts switching operation at a timing substantially same as the time t1. Then, in response to the activation of the second converter section 102, also the DC voltage E5 which is a voltage across the smoothing capacitor Co7 provided on the secondary side of the second converter section 102 rises substantially at time t1 as seen from (d) of FIG. 7. However, since, at this point of time, the transistor Q7 of the DC switch circuit 6A is in an off state, the secondary side DC output voltage Eo5 which is a voltage across the smoothing capacitor Co8 does not rise as seen from (f) of FIG. 7.

Here, the secondary side DC output voltage Eo is placed into a state in which it reaches a prescribed level at time t1A after lapse of a certain interval of time from time t1. In response to this, the secondary side DC output voltage Eo is inputted as an on/off control signal. In the DC switch circuit 6A of the second converter section 102, the base voltage of the transistor Q8 gradually rises in such a manner as seen in (e) of. FIG. 7, for example, at a timing of this time t1A. The inclination of the rise of the base voltage is determined by the time constant of a resistor R8 and a time constant capacitor C8.

Then, if the base voltage of the transistor Q8 comes to a predetermined level, for example, at time t2, then the transistor Q8 is placed fully into an on state. Then, at this time, a state wherein also the transistor Q7 is fully on is obtained, and the DC voltage E5 illustrated in (d) of FIG. 7 which is a voltage across the smoothing capacitor Co7 is supplied to the smoothing capacitor Co8 through the transistor Q7. Consequently, the secondary side DC output voltage Eo5 which is a voltage across the smoothing capacitor Co8 rises from time t2 in such a manner as seen in (f) of FIG. 7.

Then, the secondary side DC output voltage Eo5 rising at time t2 in such a manner as described above is inputted as an on/off control signal to the DC switch circuit 6 of the first converter section 101 side.

In response to this, the operation that the base voltage of the bipolar transistor Q6 rises in a period of time determined by the time constant of the resistor R4 and the time constant capacitor C3 as seen in (g) of FIG. 7 is obtained with the DC switch circuit 6.

Then, if the base voltage of the bipolar transistor Q6 comes to a predetermined level until the bipolar transistor Q6 is placed fully into an on state, for example, at time t3, then a state wherein also the transistor Q5 is fully on is obtained. As a result, the DC voltage E4 illustrated in (c) of FIG. 7 is supplied to the smoothing capacitor Co6 through the transistor Q5. Consequently, the secondary side DC output voltage Eo4 which is a voltage across the smoothing capacitor Co6 rises from time t3 in such a manner as seen from (h) of FIG. 7.

In this manner, also in the power supply circuit shown in FIG. 6, rising timings of the secondary side DC output voltages similar to those of the circuit of FIG. 11 are obtained.

Then, also with the power supply circuit of the present second embodiment, such effects as enhancement of the power conversion efficiency, reduction in size and weight of the circuit and enhancement of the stability by reduction of interference between the grounds as a power supply circuit having a power factor improving function are obtained from similar reasons to those of the power supply circuit of the first embodiment.

Further, reduction of the number of parts and reduction of the switching loss by reduction of converter sections can be anticipated.

Here, if the configuration of the switching converter of the present invention is used as a basic configuration, then the number of converter sections can be reduced to one. This can be recognized easily if the configuration of the second embodiment shown in FIG. 6 is referred to. In particular, in the configuration shown in FIG. 6, after the first converter section 101 is started with the starting signal Vt1, the secondary side DC output voltages Eo5 and Eo are inputted to the DC switch circuits 6 and 6A each of which includes a time constant circuit so that the secondary side DC output voltages are started in accordance with a prescribed order as illustrated in FIG. 7. In this instance, since a starting signal is not inputted to the starting terminal Vt of the control IC 2 of the second converter section 102, it is possible to adopt a configuration wherein also the second converter section 102 is omitted and the only one first converter section 101 produces and outputs necessary secondary side DC output voltages Eo and Eo1 to Eo6. This can be achieved technically readily.

However, in the present embodiment, the switching power supply circuit includes two converter sections as shown in FIGS. 1 and 6 and does not have a configuration which includes only one converter section taking the following matter into consideration.

In particular, the power supply circuits of the presents shown in FIGS. 1 and 6 are incorporated as the switching power supply circuit 11 of the plasma display apparatus 10 as shown in FIG. 1. As well known, the plasma display apparatus 10 can be formed, from its structure as a display device, in a considerably small size and thickness in the depthwise direction when compared with, for example, a CRT (Cathode Ray Tube). The fact that the plasma display apparatus 10 is thin in this manner is a significant merit, for example, in terms of installation and so forth of a plasma display apparatus. In short, it is considered that preferably a plasma display apparatus is formed with a thickness as reduced as possible.

From such a situation as just described, it is requested that also a power supply circuit board incorporated in a plasma display apparatus be sized and shaped so that it does not make an obstacle to reduction in thickness of the plasma display apparatus. In order to achieve this, regarding the size and the shape of the power supply circuit board, it is requested to make the height lower. However, since the insulating converter transformer PIT has a comparatively great height among parts which form the power supply circuit, the height of the power supply circuit board depends upon the height of the insulating converter transformer PIT.

As described hereinabove, in the power supply circuit of the first embodiment shown in FIG. 1, the cores (bobbins) of EER-40 and EER-42 are used for the insulating converter transformers PIT-1 and PIT-2, respectively, as described hereinabove. With the cores of such sizes, where they are used in a vertical posture, the height is within a range from approximately 41 mm to 46 mm, but where they are used in a horizontal posture, the height is within another range from approximately 30 mm to 35 mm. Accordingly, also the height of the power supply circuit board corresponds to the size.

It is to be noted that, also with regard to the power supply circuit of the second embodiment shown in FIG. 6, since the cores (bobbins) of similar sizes and shapes are used for the insulating converter transformers PIT-1 and PIT-2, also the height of the power supply circuit board is substantially equal to that described above.

Under present conditions, such a layout, a structure and so forth of internal parts in which such a height of the power supply circuit board as mentioned above does not make an obstacle to achievement of a thin configuration of the plasma display apparatus are used.

However, if the number of converter sections is reduced to one while a total load condition (load power 600 W) equal to that of the power supply circuits shown in FIGS. 1 and 6 is satisfied, then also the number of insulating converter transformers PIT used is reduced to one. Consequently, power transmission from the primary side to the secondary side in accordance with the load condition of 600 W described above relies only upon the single insulating converter transformer PIT.

Therefore, it is necessary to increase the core (bobbin) size of the insulating converter transformer PIT when compared with the power supply circuit of the embodiments shown in FIG. 1 or 6. In other words, if it is tried to decrease the number of converter sections while the load condition remains equal, then it is necessary to increase the core (bobbin) size of the insulating converter transformer PIT as much. Where the number of converter sections is reduced to one while the configurations shown in FIGS. 1 and 6 are used as a basic configuration, at the smallest, EER-49 must be selected actually.

The EER-49 has a height of approximately 50 mm where it is used in a vertical posture, and has approximately 37 mm even where it is used in a horizontal posture. If they are compared with those of the EER-40 or the EER-42, then an increase of the size in a unit of centimeter is invited. This may give rise to a case wherein a plasma display apparatus is not formed with a thickness size reduced by a required amount.

Therefore, in the present embodiment, the number of converter sections is not reduced to one but is set to 2. In other words, the present embodiment is configured such that only one converter section is deleted from the configuration (FIG. 11) of the related art which includes three converter sections, and hence the present embodiment includes two converter sections. Consequently, both of the merits of reduction of the number of parts and of the low loss by elimination of a converter section and of that reduction in thickness of the plasma display apparatus is not disturbed are achieved.

In short, it can be said that the number of converters of the power supply circuit of the present embodiment should be determined depending upon the equilibrium of effects by reduction of a converter section and a required size and shape of a power supply circuit board.

Further, the present invention is not limited to the configurations of the power supply circuit described hereinabove.

For example, for the switching elements, any element other than a MOS-FET may be adopted only if it can be used in a separate excitation scheme such as an IGBT (Insulated Gate Bipolar Transistor). Further, also the constants of the part elements described hereinabove may be altered in accordance with actual conditions and so forth.

Further, according to the present invention, a power supply circuit can be constructed including a current resonance type converter of the self-excited half-bridge connection type. In this instance, for example, a bipolar transistor can be selected for the switching elements.

Furthermore, also the circuit configuration for producing secondary side DC output voltages, for example, on the secondary side of the insulating converter transformer PIT may be altered suitably.

Further, also the configuration of the power factor improving circuit 3 is not limited to those disclosed as the embodiments described above, but any of circuit configurations according to the various voltage feedback systems which have been proposed by the assignee of the present invention can be adopted if it is applicable.

Further, in the power supply circuit based on the present invention, also the number of stages of switching converters need not necessarily be limited to two stages as disclosed, for example, as the embodiments as can be recognized from the foregoing description. The number of stages should be determined depending upon the equilibrium of effects provided by reduction of the number of converter sections and the required size and shape for a power supply circuit board, and may be altered suitably in accordance with, for example, the load power to be achieved, the number of required secondary side DC output voltages and so forth. Further, since the number of secondary side DC output voltages to be produced by the converter sections is not particularly limited. In addition, according to the present invention, if the configuration that the DC switch circuits 6 and 6A (switch sections) are provided is adopted, then it is possible to reduce the number of switching converter sections, which are required to obtain an equal number of secondary side DC output voltages, when compared with that in an alternative case wherein a power supply circuit having a same load condition and a same secondary side DC output voltage number is configured based on the related art.

Furthermore, the switching power supply circuit of the present invention may be incorporated in apparatus other than plasma display apparatus. In particular, the switching power supply circuit can be incorporated in various apparatus which are required to produce a plurality of DC output voltages (secondary side DC output voltages) in accordance with a comparatively great number of different load conditions and besides required to successively start the DC output voltages successively at predetermined timings.

The invention claimed is:

1. A switching power supply circuit which includes a rectification section for rectifying an AC input voltage and a smoothing section for smoothing the rectification voltage from said rectification section, and a first switching converter section and a second switching converter section for receiving and operating with the smoothed voltage from said smoothing section as a DC input voltage, said first and second switching converter sections being activated at different timings from each other when to be activated, wherein
each of the plurality of switching converter sections includes:
a switching section for receiving the DC input voltage to perform switching operation, said switching section being formed from a high side switching element and a low side switching element connected in a half-bridge connection;

a switching driving section for switching driving the switching elements;

an insulating converter transformer formed by winding at least a primary winding to which a switching output obtained by the switching operation of said switching section is supplied and a secondary winding in which an alternating voltage as a switching output obtained in said primary winding is excited;

a primary side series resonance circuit formed at least from a leakage inductance component of said primary winding of said insulating converter transformer and a capacitance of a primary side series resonance capacitor connected in series to said primary winding for making operation of said switching section that of a current resonance type;

a primary side partial voltage resonance circuit formed from a capacitance of a partial voltage resonance capacitor connected in parallel to one of the two switching elements each of which forms the half bridge connection and a leakage inductance component of said primary winding of said insulating converter transformer, voltage resonance operation of said primary side partial voltage resonance circuit being obtained only in response to each of timings at which each of said switching elements turns on and turns off;

a DC output voltage production section for receiving a secondary side AC voltage obtained by said secondary winding of said insulating converter transformer and performing rectification operation of the received secondary side AC voltage to produce a plurality of secondary side DC output voltages;

a frequency control type fixed voltage control section for controlling said switching driving section in response to a level of a required one of the plurality of secondary side DC output voltages to vary the switching frequency of said switching section to perform fixed voltage control for the required one of the secondary side DC output voltages;

an inductance control type fixed voltage control section provided for each of required ones of the secondary side DC output voltages which are required to be fixed voltages other than the required one of the secondary side DC output voltages which is an object of the fixed voltage control by said frequency control type fixed voltage control section, said inductance control type fixed voltage control section being configured such that a controlled winding of a control transformer in the form of a saturable reactor having a control winding and said controlled winding wound thereon is inserted in a secondary side rectification current path for producing the secondary side DC output voltage and a control current level to be supplied to said control winding is varied in response to the inputted secondary side DC output voltage level to vary the inductance of the controlled winding thereby to perform fixed voltage control for the secondary side DC output voltage; and a power factor improving circuit including a power factor improving transformer formed by winding a power factor improving primary winding inserted in series in said primary side series resonance circuit and a power factor improving secondary winding inserted in a rectification current path formed as said rectification smoothing section and a rectification element inserted in a required location of said rectification current path for performing switching operation based on an excited voltage excited in said power factor improving secondary winding by said power factor improving primary winding to interrupt the rectification current for improving the power factor;

said first switching converter section including a first switch section for operating, at a timing after predetermined time elapses after a predetermined secondary side DC output voltage rises, to change over a secondary side rectification current path for producing another predetermined secondary side DC output voltage from an off state to an on state.

2. A switching power supply circuit according to claim 1, wherein said first switch section changes over the secondary side rectification current path from an off state to an on state in response to an activation control signal inputted at the timing after the lapse of the predetermined time.

3. A switching power supply circuit according to claim 1, wherein:

said rectification section is diodes connected in a bridge connection and has two terminals to which the AC input voltage is supplied, a reference potential terminal connected to a reference potential and a rectification voltage output terminal from which a rectification voltage is outputted;

said smoothing section is two smoothing capacitors connected in series between said rectification voltage output terminal and said reference potential terminal through a node therebetween; and said switching power supply circuit further comprises a second switch section provided between one of the two terminals to which the AC input voltage is supplied and said node for performing changeover such that, when the AC input voltage is lower than a reference voltage, a voltage doubler rectification operation wherein said second switch section is placed into an on state to produce a rectification smoothed voltage of a level equal to twice the AC input voltage level is performed, but when the AC input voltage is higher than the reference voltage, an equal voltage rectification operation wherein said second switch section is placed into an off state to produce the rectification smoothed voltage of another level equal to the AC input voltage level is performed.

4. A first switching power supply circuit and another switching power supply circuit which include a rectification section for rectifying an AC input voltage and a smoothing section for smoothing the rectification voltage from said rectification section, and a plurality of switching converter sections for receiving and operating with the smoothed voltage from said smoothing section as a DC input voltage, one of said plurality of switching converter sections being activated at a timing determined in advance, wherein each of the plurality of switching converter sections includes:

a switching section for receiving the DC input voltage to perform switching operation, said switching section being formed from a high side switching element and a low side switching element connected in a half-bridge connection;

a switching driving section for switching driving the switching elements;

an insulating converter transformer formed by winding at least a primary winding to which a switching output obtained by the switching operation of said switching section is supplied and a secondary winding in which an alternating voltage as a switching output obtained in said primary winding is excited;

a primary side series resonance circuit formed at least from a leakage inductance component of said primary winding of said insulating converter transformer and a capacitance of a primary side series resonance capacitor connected in series to said primary winding for making operation of said switching section that of a current resonance type;

a primary side partial voltage resonance circuit formed from a capacitance of a partial voltage resonance capacitor connected in parallel to one of the two switching elements each of which forms the half bridge connection and a leakage inductance component of said primary winding of said insulating converter transformer, voltage resonance operation of said primary side partial voltage resonance circuit being obtained only in response to each of timings at which each of said switching elements turns on and turns off;

a DC output voltage production section for receiving a secondary side AC voltage obtained by said secondary winding of said insulating converter transformer and performing rectification operation of the received secondary side AC voltage to produce a plurality of secondary side DC output voltages;

a frequency control type fixed voltage control section for controlling said switching driving section in response to a level of a required one of the plurality of secondary side DC output voltages to vary the switching frequency of said switching section to perform fixed voltage control for the required one of the secondary side DC output voltages;

an inductance control type fixed voltage control section provided for each of required ones of the secondary side DC output voltages which are required to be fixed voltages other than the required one of the secondary side DC output voltages which is an object of the fixed voltage control by said frequency control type fixed voltage control section, said inductance control type fixed voltage control section being configured such that a controlled winding of a control transformer in the form of a saturable reactor having a control winding and said controlled winding wound thereon is inserted in a secondary side rectification current path for producing the secondary side DC output voltage and a control current level to be supplied to said control winding is varied in response to the inputted secondary side DC output voltage level to vary the inductance of the controlled winding thereby to perform fixed voltage control for the secondary side DC output voltage; and a first switch section for changing over the secondary side rectification current path for producing another predetermined secondary side DC output voltage from an off state to an on state at the timing after lapse of a predetermined time after a predetermined secondary side DC output voltage rises; and a power factor improving circuit for improving the power factor;

said power factor improving circuit including a power factor improving transformer formed by winding a power factor improving primary winding inserted in series in said primary side series resonance circuit and a power factor improving secondary winding inserted in a rectification current path formed as said rectification smoothing section and a rectification element inserted in a required location of the rectification current path for performing switching operation based on an excited voltage excited in said power factor improving secondary winding by said power factor improving primary winding to interrupt the rectification current.

5. A switching power supply circuit according to claim 1, wherein each of said first switch section provided in said first switching converter section and said first switch section provided in the other switching converter section receives a predetermined one of the plurality of secondary side DC output voltages produced by said DC output voltage production section of said first switching converter section and changes over the secondary side rectification current path from an off state to an on state after a delay of time obtained by a time constant circuit after a point of time at which the secondary side DC output voltage being received rises.

6. A switching power supply circuit according to claim 1, wherein said rectification section is diodes connected in a bridge connection and has two terminals to which the AC input voltage is supplied, a reference potential terminal connected to a reference potential and a rectification voltage output terminal from which a rectification voltage is outputted;

said smoothing section is two smoothing capacitors connected in series between said rectification voltage output terminal and said reference potential terminal through a node therebetween; and said switching power supply circuit further comprises a second switch section provided between one of the two terminals to which the AC input voltage is supplied and said node for performing changeover such that, when the AC input voltage is lower than a reference voltage, a voltage doubler rectification operation wherein said second switch section is placed into an on state to produce a rectification smoothed voltage of a level equal to twice the AC input voltage level is performed, but when the AC input voltage is higher than the reference voltage, an equal voltage rectification operation wherein said second switch section is placed into an off state to produce the rectification smoothed voltage of another level equal to the AC input voltage level is performed.

7. A plasma display apparatus, comprising a switching power supply circuit according to claim 1 or 4, the secondary side DC output voltage being supplied as a driving power supply to said plasma display apparatus.

* * * * *

UNITED STATES PATENT AND TRADEMARK OFFICE
CERTIFICATE OF CORRECTION

PATENT NO. : 7,298,634 B2 Page 1 of 1
APPLICATION NO. : 10/534142
DATED : November 20, 2007
INVENTOR(S) : Masayuki Yasumura It is certified that error appears in the above-identified patent and that said Letters Patent is hereby corrected as shown below:

Title Page item 57
In the Abstract, Line 7, "but serves" should read --and as--;

In Column 3, Line 19, insert --the-- immediately after "substantially";

In Column 3, Line 48, delete "a" immediately after the second occurrence of "of";

In Column 6, Line 25, "are" should read --is--;

In Column 11, Line 40, "a" should read --an--;

In Column 18, Line 60, "is" should read --are--;

In Column 21, Line 11, "are" should read --is--;

In Column 28, Line 24, insert --at-- immediately after "remains";

In Column 39, Line 16, "does" should read --do--;

In Column 40, Line 31, delete "since";

Signed and Sealed this

Twenty-eighth Day of October, 2008

JON W. DUDAS
*Director of the United States Patent and Trademark Office*